United States Patent
Alharbi et al.

(10) Patent No.: US 11,496,069 B2
(45) Date of Patent: Nov. 8, 2022

(54) ELECTROSTATIC GENERATOR HAVING METALLIC PATTERNED SURFACE

(71) Applicant: King Fahd University of Petroleum and Minerals, Dhahran (SA)

(72) Inventors: Hosam Salem Alharbi, Dhahran (SA); Muhammad Khalid, Dhahran (SA); Mohammad Ali Abido, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/401,998

(22) Filed: Aug. 13, 2021

(65) Prior Publication Data
US 2021/0376766 A1    Dec. 2, 2021

Related U.S. Application Data

(63) Continuation of application No. 16/364,558, filed on Mar. 26, 2019, now Pat. No. 11,133,756.

(51) Int. Cl.
| H02N 1/06 | (2006.01) |
|---|---|
| H02N 1/08 | (2006.01) |
| H02N 1/00 | (2006.01) |
| H02M 3/158 | (2006.01) |

(52) U.S. Cl.
CPC ............. *H02N 1/06* (2013.01); *H02M 3/158* (2013.01); *H02N 1/00* (2013.01); *H02N 1/002* (2013.01); *H02N 1/08* (2013.01)

(58) Field of Classification Search
CPC .. H02N 1/00; H02N 1/06; H02N 1/08; H02N 1/002; H02N 1/004; H02N 1/006; H02N 1/008; H02N 1/10; H02N 1/12; H02M 3/158; H02M 3/07

USPC ......................................... 310/310, 309, 308
See application file for complete search history.

(56) References Cited

U.S. PATENT DOCUMENTS

| 5,187,635 | A |   | 2/1993  | Yehl |   |
|---|---|---|---|---|---|
| 5,248,930 | A |   | 9/1993  | Taylor |   |
| 5,578,280 | A | * | 11/1996 | Kazi | ........................ C01B 13/11 |
|   |   |   |   |   | 422/186.13 |

(Continued)

FOREIGN PATENT DOCUMENTS

| CN | 2618239 Y | 5/2004 |
|---|---|---|
| CN | 105634322 | 6/2016 |

(Continued)

OTHER PUBLICATIONS

Du et al, Device for Charging and Charge Generating Method, Jun. 1, 2016, CN 105634322 (English Machine Translation) (Year: 2016).*

(Continued)

*Primary Examiner* — Alexander A Singh
(74) *Attorney, Agent, or Firm* — Oblon, McClelland, Maier & Neustadt, L.L.P.

(57) ABSTRACT

A Static Electrostatic Generator (SEG) is disclosed which produces static charges at high voltage and low current. The SEG is capable of generating positive or negative charges on a metal sphere by reversing the polarity of a DC source. The conversion efficiency of the system is about 47% and its design is simple, lightweight, and easy to manufacture. The SEG is a static device and no mechanical movement is required to produce charges. Also, the design is easily scalable.

4 Claims, 22 Drawing Sheets

(56) References Cited

U.S. PATENT DOCUMENTS

| | | | |
|---|---|---|---|
| 5,584,938 A * | 12/1996 | Douglas | B08B 6/00 15/151 |
| 2012/0126756 A1 | 5/2012 | Vranish | |
| 2014/0175941 A1 | 6/2014 | Johnson | |

FOREIGN PATENT DOCUMENTS

| | | | |
|---|---|---|---|
| CN | 105634322 A | * | 6/2016 |
| KR | 10-1811958 | | 12/2017 |

OTHER PUBLICATIONS

NightHawkInLight; How to make a $5 static electricity generator; Mar. 3, 2016 ; EPSON ; 16 Pages.

NightHawkInLight; Make a Static Electricity Generator & Cast Lightning from Your Fingertips ; Sep. 20, 2013 ; Instructables ; 15 Pages.

Mouser Electronics ; IXYS IXRF1N450 ; Feb. 14, 2019 ; Product; 3 Pages.

* cited by examiner

ELECTROSTATIC GENERATOR HAVING METALLIC PATTERNED SURFACE

CROSS-REFERENCE TO RELATED APPLICATIONS

The present application is a Continuation of U.S. application Ser. No. 16/364,558, now allowed, having a filing date of Mar. 26, 2019.

STATEMENT OF ACKNOWLEDGMENT

The support provided by the Deanship of Research (DSR) at King Fand University of Petroleum and Minerals (KFUPM) for funding this work through Project No. RG171009.

BACKGROUND

Technical Field

The present disclosure is directed to a static electrostatic generator (SEG), especially for high voltage, low power applications. Electrostatic charges accumulate on the surface of a metal sphere. The SEG is a static device and no mechanical movement is required to produce charges.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the early 1900s, physics researchers expressed a need for a high voltage DC source, in millions of volts, with low current to accelerate electrons and ions to investigate internal atom structure. However, with the available equipment at that time, a costly, huge and well-insulated transformer and a high voltage rectifier was needed to provide high DC voltage for a particle accelerator. (See R. L. Fortescue and P. D. Hall, "The high-voltage electrostatic generator at the atomic energy research establishment," Proceedings of the IEEE—Part I: General, Vol. 96, No. 98, pp. 77-85, March 1949; J. F. Smee, "A 700-kv direct-current electrostatic generator," Journal of the Institution of Electrical Engineers—Part I: General, Vol. 91, No. 47, pp. 422-431, November 1944; and F. H. Merrill, "The Van de Graaff electrostatic generator," Students' Quarterly Journal, Vol. 9, No. 35, pp. 124-127, March 1939, each incorporated herein by reference in their entirety). Van de Graaff et al. presented a simple and economical solution to produce a high DC voltage source using a low current source. (See Van de Graaff et al. "The electrostatic production of high voltage for nuclear investigations," Physical Review, Vol. 43, Issue 3, pp. 149-157, 02/1933, incorporated herein by reference in its entirety).

Since the inception of the electrostatic generator and its impact on nuclear physics research, it has received much attention and has frequently been the object of research.

In the renewable energy sector, electrostatic generation plays an important role. With increasing energy demands worldwide and effects to earth's ecosystem, such as global warming and pollution, caused by traditional energy sources, such as oil, coal and nuclear, the need for the renewable energy sources has increased. The increasing demands of renewable energy sources, capital cost reduction, and efficient renewable energy systems have motivated researchers to investigate ways to improve renewable energy to make it a more viable economic option. A variable capacitor, a type of electrostatic generator, as a power source for space applications using electrets was studied. (See R. E. Matthew, "The use of electrets in electrostatic generators for space," Electrical Engineering, Vol. 81, No. 11, pp. 850-854, November 1962, incorporated herein by reference in its entirety). More recently, electrostatic power generation for wind turbines shows promising results for power grid generation. An offshore wind farm utilizing an HVDC generator to transmit power efficiently may eliminate the need for an AC to DC converter since the electricity generated is DC. (See R. O'Donnell, N. Schofield, A. C. Smith, and J. Cullen, "Design concepts for high-voltage variable-capacitance dc generators," IEEE Transactions on Industry Applications, Vol. 45, No. 5, pp. 1778-1784, September 2009, incorporated herein by reference in its entirety). An electrostatic wind converter (EWICON) was developed to replace traditional wind generators. EWICON generates electrical power by forcing charges to move in a direction opposite to the electric field by using the wind to increase the energy of the system. (See D. Djairam, P. H. F. Morshuis, and J. J. Smit, "A novel method of wind energy generation—the electrostatic wind energy converter," IEEE Electrical Insulation Magazine, Vol. 30, No. 4, pp. 8-20, July 2014, incorporated herein by reference in its entirety). A high-efficiency ballistic electrostatic generator utilizing microdroplets has been developed. (See Y. Xie, D. Bos, L. J. de Vreede, H. L. de Boer, M.-J. Van der Meulen, M. Versluis, A. J. Sprenkels, A. Van den Berg, and J. C. T. Eijkel, "High-efficiency ballistic electrostatic generator using microdroplets," Nature Communications, Vol. 5, p. 3575, April 2014. [Online]. Available: http://dx.doi.org/10.1038/ncomms4575, incorporated herein by reference in its entirety).

In the field of energy harvesting, an electrostatic generator known as a "doubler of electricity," was developed as an energy harvesting device and a battery charger. (See A. Deihimi and M. E. S. Mahmoodieh, "Analysis and control of battery-integrated dc/dc converters for renewable energy applications," IET Power Electronics, Vol. 10, No. 14, pp. 1819-1831, 2017, incorporated herein by reference in its entirety).

Electrostatic generators have a wide range of applications, such as precipitators, electrostatic air cleaning, inkjet printers, electrostatic painting, xerography, ion thrusters and ion acceleration in nuclear research. There have been investigations into applying an electrostatic generator to rotational speed measuring using electrostatic sensing. (See L. Wang, Y. Yan, Y. Hu, and X. Qian, "Rotational speed measurement through electrostatic sensing and correlation signal processing," IEEE Transactions on Instrumentation and Measurement, Vol. 63, No. 5, pp. 1190-1199, May 2014, incorporated herein by reference in its entirety).

A DC-to-DC converter is a type of electric power converter which converts a DC source voltage from one level to another. The DC to DC converter is an elemental circuit block in many electrical devices. It is an essential part of modern system development to maximize the energy harvest for photovoltaic systems and wind turbines. Before the development of power semiconductors, conversion of a DC voltage from one level to another was through the conversion of a DC voltage to AC then back again to DC. Consequently, these converters were relatively inefficient and expensive due to the uses of different electric components and conversion losses. The introduction of power semiconductors and integrated circuits made it economically viable to use different techniques to acquire the needed voltage level, for instance, converting DC power to high-frequency AC through the usage of semiconductors. Since the transformer voltage is a function of frequency, by feeding the generated high-frequency AC to a transformer, a high level AC voltage can be obtained. A rectifier circuit is then used to convert the voltage back to DC.

Many electronic devices, such as cellular phones and laptop computers, powered by batteries use DC to DC converters. These electronic devices often have several sub-circuits, each with its voltage level, which can be different from the voltage supplied by the battery or an external supply. As the energy drains from the battery, the voltage level declines. Therefore, DC to DC converters using high-frequency switching offer a method to increase voltage from a partially lowered battery voltage thereby saving space instead of using multiple batteries to accomplish the same thing.

There is an advantage in utilizing many small DC-AC converters versus using a single DC-AC converter in residential photovoltaic systems (PV). (See G. R. Walker and P. C. Sernia, "Cascaded DC-DC converter connection of photovoltaic modules," IEEE Transactions on Power Electronics, Vol. 19, No. 4, pp. 1130-1139, July 2004, incorporated herein by reference in its entirety). The main disadvantage of a PV system is its variable voltage. This was addressed by a Matlab based model for an intermediate DC-DC converter which increases the efficiency of the system by providing an impedance match between the PV system and load (See M. Marodkar, S. Adhau, M. Sabley, and P. Adhau, "Design and simulation of DC-DC converters for photovoltaic system based on matlab," in 2015 International Conference on Industrial Instrumentation and Control (ICIC), May 2015, pp. 1478-1483, incorporated herein by reference in its entirety).

A comprehensive review demonstrated various high-voltage gain DC-DC converter topologies, control strategies, and recent trades. (See V. B. Savakhande, C. L. Bhattar, and P. L. Bhattar, "Voltage-lift DC-DC converters for photovoltaic application—a review," in 2017 International Conference on Data Management, Analytics and Innovation (ICDMAI), February 2017, pp. 172-176, incorporated herein by reference in its entirety). Different topologies having high voltage conversion ratio, low cost, and high-efficiency performance were classified into several categories. To optimize the output power of a photovoltaic system, it must operate at the maximum power point (MPP). The MPPT algorithm increases output power, and commonly works with a DC-DC converter. Additionally, an analysis and the essential features of different topologies of DC-DC converters were designed and simulated for solar photovoltaic (PV) applications. Moreover, two conventional MPPT algorithms were evaluated by computer simulation to analyze their efficiency in different environmental conditions. (See L. A. Soriano, P. Ponce, and A. Molina, "Analysis of DC-DC converters for photovoltaic applications based on conventional MPPT algorithms," in 2017 14th International Conference on Electrical Engineering, Computing Science and Automatic Control (CCE), October 2017, pp. 1-6, incorporated herein by reference in its entirety).

A high step-up DC-DC converter was reconfigured and integrated with conventional DC-DC converters and a battery. The reconfiguration of a battery-integrated DC-DC converter, BICs, with the linear quadratic regulator (LQR), was verified through simulations and experimental results. (See A. Deihimi and M. E. S. Mahmoodieh, "Analysis and control of battery-integrated dc/dc converters for renewable energy applications," IET Power Electronics, Vol. 10, No. 14, pp. 1819-1831, 2017, incorporated herein by reference in its entirety). A high-efficiency DC-DC converter with high voltage gain based on coupled inductors, intermediate capacitor, and leakage energy recovery scheme was developed, using mutual coupling between conductors to store energy in a magnetic field. The mutually coupled conductors are connected to capacitors at the output stage in a lossless manner. This high efficiency and high gain converter has an efficiency of 96% for low output voltage sources. (See M. Das and V. Agarwal, "Design and analysis of a high-efficiency DC-DC converter with soft switching capability for renewable energy applications requiring high voltage gain," IEEE Transactions on Industrial Electronics, Vol. 63, No. 5, pp. 2936-2944, May 2016, incorporated herein by reference in its entirety).

A high-voltage gain DC-DC converter for PV systems was shown to increase voltage up to 311 V at maximum power. This converter utilized coupled conductors and sets of capacitors and semiconductors, and is suitable for low input voltages and low-power applications. (See A. A. A. Freitas, F. L. Tofoli, E. M. S. Júnior, S. Daher, and F. L. M.Antunes, "High-voltage gain dc-dc boost converter with coupled inductors for photovoltaic systems," IET Power Electronics, Vol. 8, No. 10, pp. 1885-1892, 2015, incorporated herein by reference in its entirety). A multi-port high-voltage-gain DC-DC converters with two boost stages at the input is known, in which the output voltage is twenty times the input voltage. (See V. A. K. Prabhala, P. Fajri, V. S. P. Gouribhatla, B. P. Baddipadiga, and M. Ferdowsi, "A DC-DC converter with high voltage gain and two input boost stages," IEEE Transactions on Power Electronics, Vol. 31, No. 6, pp. 4206-4215, June 2016, incorporated herein by reference in its entirety). A soft-switching DC-DC converter for renewable energy conversion systems with solar PV cell or fuel cell stack as an input to achieve zero-voltage switching (ZVS) a turn-on for active switches and zero-current switching (ZCS), a turn-off for fast recovery diodes is known. This converter is described to achieve high step-up voltage conversion ratio by utilizing a boost converter and a voltage-doubler configuration with a coupled inductors. (See B. R. Lin and J. Y. Dong, "New zero-voltage switching DC-DC converter for renewable energy conversion systems," IET Power Electronics, Vol. 5, No. 4, pp. 393-400, April 2012, incorporated herein by reference in its entirety).

A high-efficiency dual-mode resonant converter topology with a detailed theoretical analysis of the converter operation and its DC gain features was developed. (See Z. Liang, R. Guo, J. Li, and A. Q. Huang, "A high-efficiency pv module-integrated DC/DC converter for PV energy harvest in FREEDM systems," IEEE Transactions on Power Electronics, Vol. 26, No. 3, pp. 897-909, March 2011, incorporated herein by reference in its entirety). Additionally, a converter was developed which can maintain high efficiency for a wide input range at different output power levels by changing resonant modes depending on the panel operation conditions. Integrating a switched capacitor and a switched coupled inductor, into one converter increased the voltage gain, such that the developed DC-DC converter configuration demonstrated an efficiency of 93.6% at full load. (See S. M. Chen, M. L. Lao, Y. H. Hsieh, T. J. Liang, and K. H. Chen, "A novel switched-coupled-inductor DC-DC step-up converter and its derivatives," IEEE Transactions on Industry Applications, Vol. 51, No. 1, pp. 309-314, January 2015, incorporated herein by reference in its entirety). A DC-DC converter with high voltage gain, zero current switching of the main switch, and low voltage stress of the main switches is known. This converter has a high voltage gain, and employs fewer components than a traditional converter. (See "A novel switched-coupled-inductor DC-DC step-up converter and its derivatives," IEEE Transactions on Industry Applications, Vol. 51, No. 1, pp. 309-314, January 2015, incorporated herein by reference in its entirety). A high-conversion-ratio bidirectional DC-DC converter with maximum efficiency reaching up to 96.41% was developed by utilizing coupled inductors with a lower turn ratio, and high conversion ratio. (See H. Liu, L. Wang, Y. Ji, and F. Li, "A novel reversal coupled inductor high-conversion-ratio bidirectional DC-DC converter," IEEE Transactions on Power Electronics, Vol. 33, No. 6, pp. 4968-4979, June 2018, incorporated herein by reference in its entirety). An interleaved boost converter was shown to achieve high step-up voltage conversion ratio with a maximum efficiency of 94.5%. (See Y. T. Chen, Z. X. Lu, R. H. Liang, and C. W. Hung, "Analysis and implementation of a novel high step-up DC-DC converter with low switch voltage stress and reduced diode voltage stress," IET Power Electronics, Vol. 9, No. 9, pp. 2003-2012, 2016, incorporated herein by reference in its entirety). A bidirectional DC-DC converter utilizing only two switches and LC resonant transformer capable of controlling the power flow with high efficiency of 92% is known. (See M. Ishigaki, J. Shin, and E. M. Dede, "A novel soft switching bidirectional DC-DC converter using magnetic and capacitive hybrid power transfer," IEEE Transactions on Power Electronics, Vol. 32, No. 9, pp. 6961-6970, September 2017, incorporated herein by reference in its entirety). A converter which utilizes the techniques of switched-capacitor, coupled-inductor, and multiplier capacitor to achieve the high voltage gain was developed. (See Y. T. Chen, Z. X. Lu, and R. H. Liang, "Analysis and design of a novel high-step-up DC-DC converter with coupled inductors," IEEE Transactions on Power Electronics, Vol. 33, No. 1, pp. 425-436, January 2018, incorporated herein by reference in its entirety). In S. Du et al. (2016), multilevel DC-DC converters were presented, for interconnecting medium-voltage DC networks. (See S. Du, B. Wu, K. Tian, D. Xu, and N. R. Zargari, "A novel medium-voltage modular multilevel DC-DC converter," IEEE Transactions on Industrial Electronics, Vol. 63, No. 12, pp. 7939-7949, December 2016, incorporated herein by reference in its entirety). A multi-input DC-DC converter with a control method for hybrid electric vehicles to enhance the efficiency and performance of the converter was developed. (See R. R. Ahrabi, H. Ardi, M. Elmi, and A. Ajami, "A novel step-up multi-input DC-DC converter for hybrid electric vehicles application," IEEE Transactions on Power Electronics, Vol. 32, No. 5, pp. 3549-3561, May 2017, incorporated herein by reference in its entirety). Additionally, a multi-input DC-DC converter was developed as a solution for galvanic isolation for AC-DC utilizing an isolation transformer. (See H. L. Jou, J. J. Huang, J. C. Wu, and K. D. Wu, "Novel isolated multilevel DC-DC power converter," IEEE Transactions on Power Electronics, Vol. 31, No. 4, pp. 2690-2694, April 2016, incorporated herein by reference in its entirety). Further, a compact and lightweight design of onboard EV charger which uses a bidirectional AC-DC single-stage converter was developed. (See U. R. Prasanna, A. K. Singh, and K. Rajashekara, "Novel bidirectional single-phase single-stage isolated ac dc converter with pfc for charging of electric vehicles," IEEE Transactions on Transportation Electrification, Vol. 3, No. 3, pp. 536-544, September 2017, incorporated herein by reference in its entirety).

Whether in energy harvesting or renewable energy sources, the working principles of the above electrostatic generators are based on mechanical force, either moving a belt, microdroplets or rotating capacitor plates, to move a medium, liquid or solid, which converts charges to a higher potential. Thus, they have lower efficiency, are bulky, and it is difficult to control the quantities of charges produced. It is clear from the vast range of applications of an electrostatic generator, that a highly efficient and reliable electrostatic generator is needed.

The Static Electrostatic Generator (SEG) of the present disclosure converts electrical energy at a low potential to a high potential. Consequently, the device can operate as a DC to DC voltage converter. Furthermore, the SEG can function as an electrostatic generator, similar to a Van de Graff generator, but unlike prior electrostatic generators, the device input and output energy of the SEG is purely electrical energy. The electrostatic generator of the present disclosure has a conversion efficiency of up to 48% when converting mechanical energy to electrical energy.

SUMMARY

In an exemplary embodiment, a static electrostatic generator (SEG) comprises a conductive metal wire having a first and a second end, a cylindrical conductive metal sheet coaxial with the metal wire, the cylindrical conductive metal sheet having a first end and a second end, an interior surface and an exterior surface, a conductive metal sphere surrounding the conductive metal wire and the cylindrical conductive metal sheet, the conductive metal sphere having an interior surface and an exterior surface, wherein the interior surface of the conductive metal sphere is evenly spaced from the exterior surface of the cylindrical conductive metal sheet. A first switch, a second switch and a third switch, each switch having a first side and a second side are included, as is a battery having a first electrode and a second electrode, wherein the first electrode is connected to the first end of the metal wire and the second electrode is attached to the first side of the first switch, wherein the second side of the first switch is connected to the first end of the cylindrical conductive metal sheet. Further included are a second switch having its first end connected to the second end of the conductive metal wire and its second end connected to the second end of the cylindrical conductive metal sheet and a third switch having its first end connected to the cylindrical conductive metal sheet and its second end connected to the interior surface of the conductive metal sphere. The SEG has a controller connected to each of the switches and including timing circuitry configured to operate the switches at specified times in order to generate static electrostatic charges on the surface of the metal sphere.

In another exemplary embodiment, a method of generating static electrostatic charges, is described, comprising connecting a first end of a conductive metal wire to a first battery electrode; connecting a first switch between a second battery electrode and a first end of a cylindrical conductive metal sheet; connecting a second switch between a second end of the conductive metal wire and a second end of the cylindrical conductive metal sheet; connecting a third switch between the cylindrical conductive metal sheet and a conductive metal sphere; closing, by a controller, the first switch; opening, by the controller, the first switch; closing, by the controller, the second switch and the third switch;

wherein closing the second and third switches causes the conductive metal sphere to accumulate electrostatic charges; discharging the conductive metal sphere; and opening, by the controller, the second switch and third switch.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
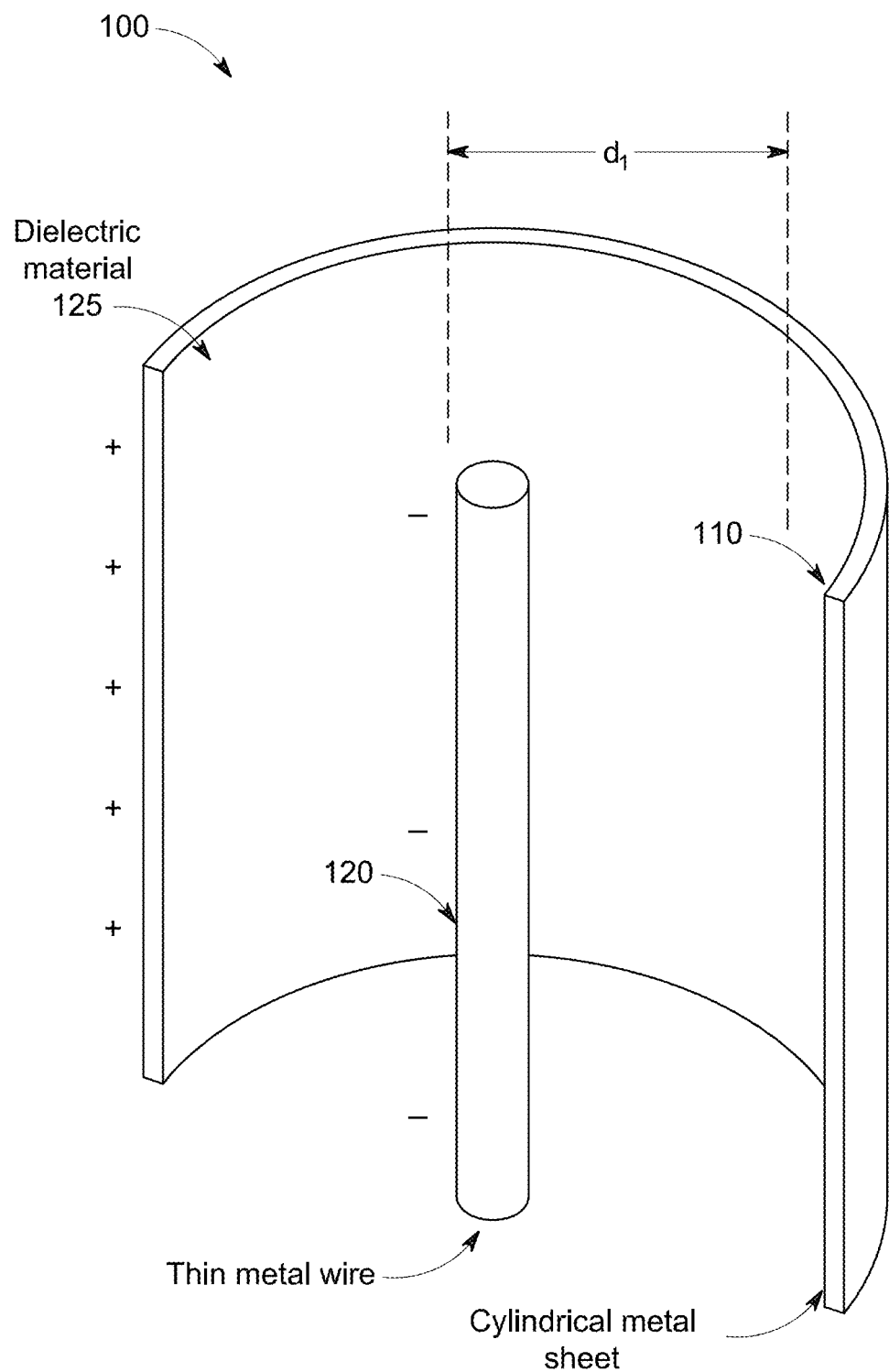
FIG. 1 is the internal construction of the SEG.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of the present disclosure describe a static electrostatic generator (SEG) and a method for operating a static electrostatic generator.

An overview of the SEG follows.

The internal elements of the SEG are a thin metal wire 120 and a cylindrical metal sheet 110. The cylindrical metal sheet 110 is spaced apart from the thin metal wire by a first distance, $d_1$, as shown in cut-out in FIG. 1. Upon application of a voltage (provided by battery 240 in FIG. 2A), negative charges build up on the surface of the wire 120, and corresponding positive charges form on the cylindrical metal sheet 110. The cylindrical metal sheet surrounds the thin metal wire as shown in FIGS. 1 and 2.

Figure 2A:
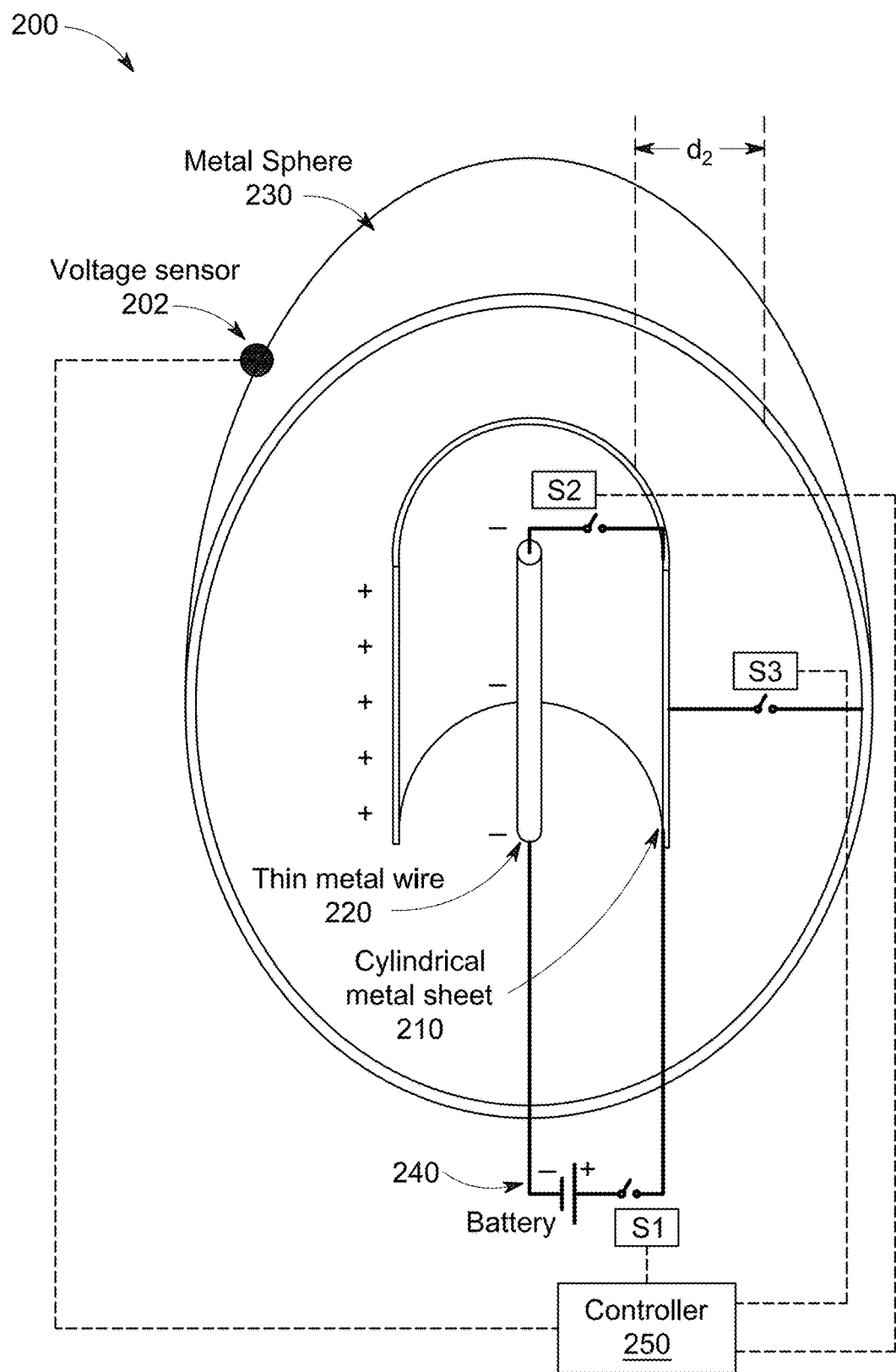
FIG. 2A is an illustration of the SEG with electrical components.

As shown in the FIG. 2A, the SEG includes a surrounding metal sphere 230, shown in cut-out in FIG. 2A for clarity, at a distance $d_2$ from the cylindrical metal sheet 210. Three switches S1, S2, and S3 are used to operate the device. The switches are electronic switches, such as transistors, electrically actuated switches, or electrically actuated mechanical switches. The switch S3 can be replaced by a diode in situations where only one type of charge, positive or negative, is generated. A controller, 250, controls the switching processes of all the switches.

During a ramp up step, the controller sends a signal to close S1 at time $\tau_1$, thus charging the metal wire 220 with negative charges and the metal cylinder 210 with positive charges. The charging time of both conductors must be considered, otherwise, the efficiency of the generated charges will be lower. Once the two metals are charged, at time $\tau_2$, the controller switches S1 OFF. Since there is no complete circuit when S1 is OFF, the charges are stored on the cylindrical metal sheet and thin wire. At time 13, the controller switches S2 and S3 ON.

Switching S1 OFF and S2 and S3 ON drives the positive charges to the metal sphere 230. The time required for the discharge of the cylindrical metal sheet 210 to the metal sphere 230 is related to the capacitance between the two conductors and the resistance of the line between them when S2 is connected. S2 and S3 must be turned OFF before the operation restarts by reconnecting S1.

In an aspect, the switches may be transistor switches, selected from the group consisting of MOSFETS, JFETS and FETs. The transistors must have high breakdown voltage ratings sufficient to withstand the high supply voltage, typically in the range of 500-1000 volts. In a non-limiting example, a MOSFET transistor may be of the type IXTF1N450 sold by Mouser Electronics, 1000 North Main Street, Mansfield, Tex. 76063, USA https://www.mouser.com/ProductDetail/IXYS/IXTF1N450?qs=%2fha2pyFaduj6YwmeOD9 vmb2P8sa3TZXSO%252bkvuue8xqUGVs-VuTXJ2Cw%3d%3d.

In an aspect, the thin metal wire, cylindrical metallic sheet and the metal sphere are selected from the group consisting of copper, aluminum, tantalum, brass and gold. The thicknesses of the cylindrical metal sheet and the metal sphere must be great enough to structurally support their lengths respectively. The thickness of the cylindrical metal sheet is in the range of 0.016 to 6.35 mm, preferably 0.05 to 2 mm, more preferably 0.075 to 1.5 mm, even more preferably 0.1 to 0.125 mm. The thickness of the metal sphere is in the range of 0.1 to 6.35 mm, preferably 0.25 to 3.0 mm, more preferably 1 to 2 mm, even more preferably 1.5 mm.

Figure 2B:
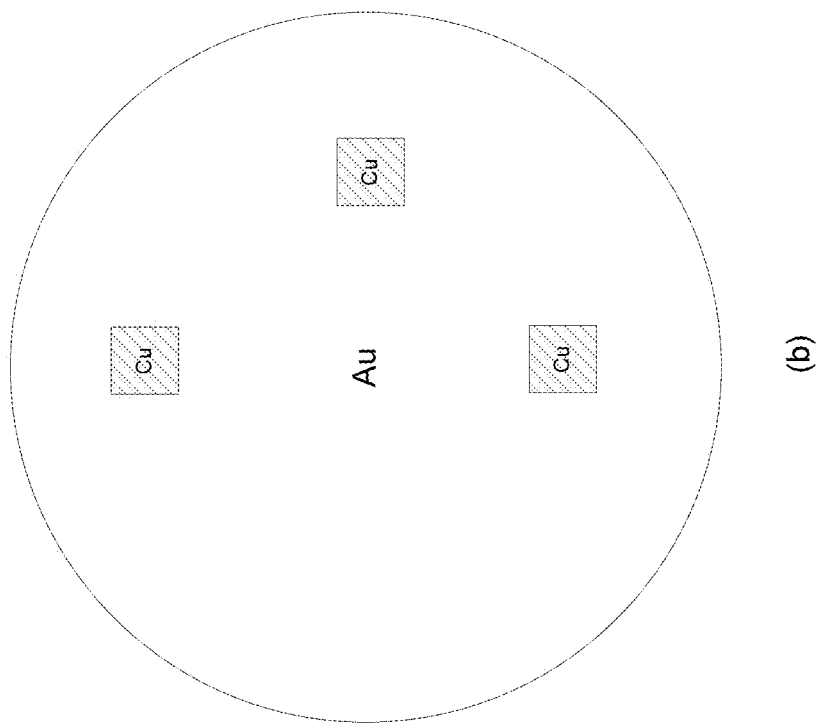
FIG. 2B is an illustration of a patterned metal sphere.
Figure 2B:
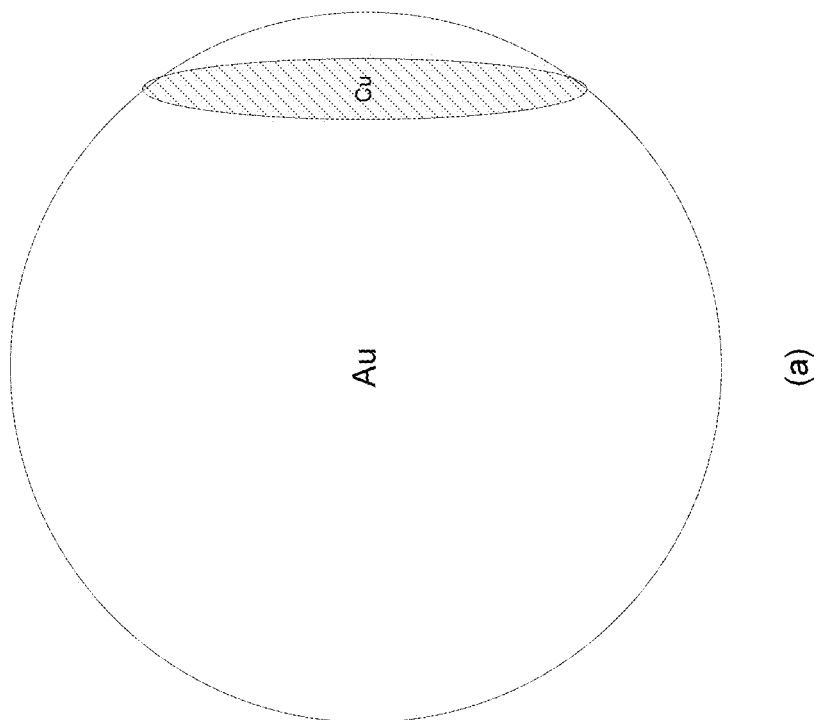

The metal sphere may be patterned with stripes or blocks of different materials. The patterns may be stripes around the sphere or blocks of metal at locations on the sphere to focus the static charge at output points. The charge density of a material is Q=σA, where σ is the electrical conductivity of the material. For example, the conductivity of copper is $5.98 \times 10^7$ $Sm^{-1}$ at 20 degrees C. and the conductivity of gold is $4.52 \times 10^7$ $Sm^{-1}$ at 20 degrees Celsius. In a non-limiting example, a gold sphere patterned with stripes of copper has a higher surface charge at the stripes than on the copper areas, as shown in FIG. 2B(a). In this configuration, the stripes provide contact points for the output of the static charges. In a further non-limiting example, the pattern may be blocks of copper on a gold sphere, which provide a base for adhering a conductive probe (not shown) which uses the static charges as shown in FIG. 2B(b). Alternatively, the pattern may be dots or circular patterns (not shown). The charge density at the copper pattern may be as much as 30% higher than the charge density at an unpatterned location.

The thin metal wire used in the descriptive embodiments has a radius in the range of 0.001 to 2.0 mm, preferably 0.001 to 1.0 mm, more preferably 0.01 to 0.16 mm, even more preferably 0.04 to 0.08 mm. However, if the invention is fabricated in a larger scale, the thin metal wire may have a larger radius, so as to handle the larger voltage needed to charge a larger metallic cylinder of the SEG. Additionally, the thin metal wire must be of material and great enough radius to structurally support the wire within the cylindrical metal sheet. In a non-limiting example, the radius of the metal cylinder is 1 mm and the length of the metal cylinder and thin wire is 10 mm.

Figure 3:
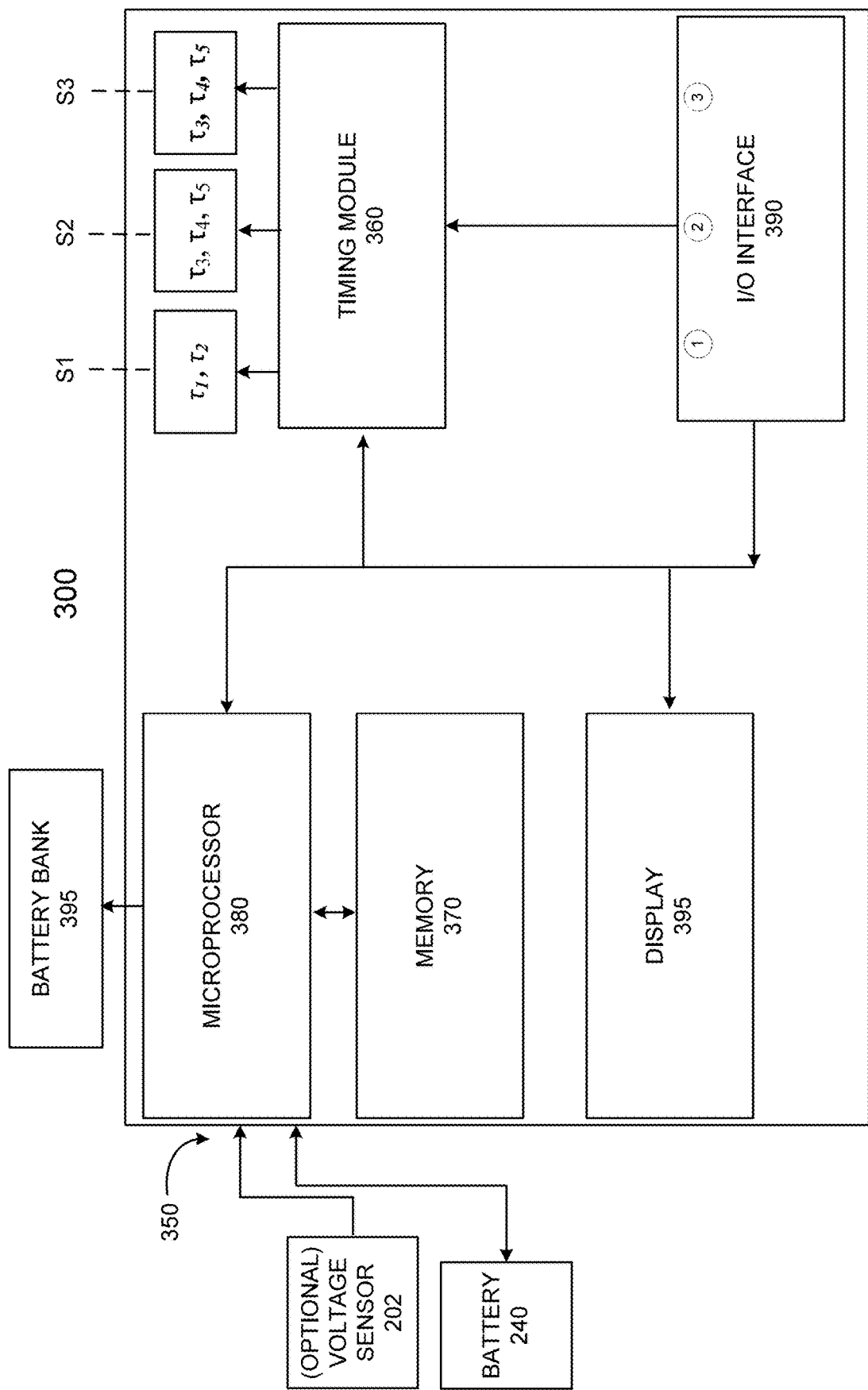
FIG. 3 is an exemplary controller which may be used with the SEG.

In an aspect, an exemplary controller 250/350 is shown in FIG. 2A, 3. The SEG design can be scalable, therefore different charging and discharging times and different high DC voltage levels can be used, thus the electrical circuit controller, wire gauges, and switch types must be considered in designing a larger SEG. Although a battery 240 is shown in FIG. 2A, the battery can be integrated into the controller 250, wherein the battery voltage is provided by a switchable DC power supply.

As mentioned above, the controller turns the switches ON and OFF at specific timing intervals. The memory 370 may be store timing settings for the switches as entered by a user at I/O Interface 390. The I/O Interface 390 may have controllable buttons (1, 2, 3) which enable a user to easily set the timing of the switches S1, S2 and S3. Alternatively, the microprocessor 380 may receive charge measurements from a sensor on the surface of the metal sphere and adjust the timing of the switches and voltage based on the measurements.

In an aspect of the present disclosure, the battery 240 is a high DC voltage source or a battery with a high DC-DC voltage converter.

In an aspect of the present disclosure, the electrostatic generator (SEG) is small, lightweight, easy to manufacture, and scalable. The SEG can be resized to generate electrostatic charges more efficiently with different voltage levels. Additionally, the SEG is reliable as it does not depend on mechanical movement to generate static charges. Moreover, the SEG produces charges in controllable quantities. The SEG has an efficiency of up to 46.95%, which is among the highest in the field of electrostatic generation. Also, the SEG does not require any gas or liquid to be under high pressure to generate the charges with high efficiency. The device can be used as a DC-DC converter however with an efficiency of 46.95%, even though the device is neither required to include an inductor, which means it is not temperature sensitive, nor must it utilize many capacitors to achieve the same high voltage level required by different applications.

As shown in FIG. 1, the internal elements of the SEG, having a thin wire 120 and a cylindrical metal sheet 110 surrounding the thin wire, are similar to a coaxial cable construction. There is a dielectric material 125 between 120 and 110. For clarity, the dielectric material is indicated but not shown within the interior of the cylinder.

Initial conditions are as such:
1) there should be no charges on any of the conductors, i.e. the conductors should be grounded initially to remove all charges,
2) the dielectric material should have no dipoles, and
3) the applied voltage should be a DC Voltage.

Figure 5:
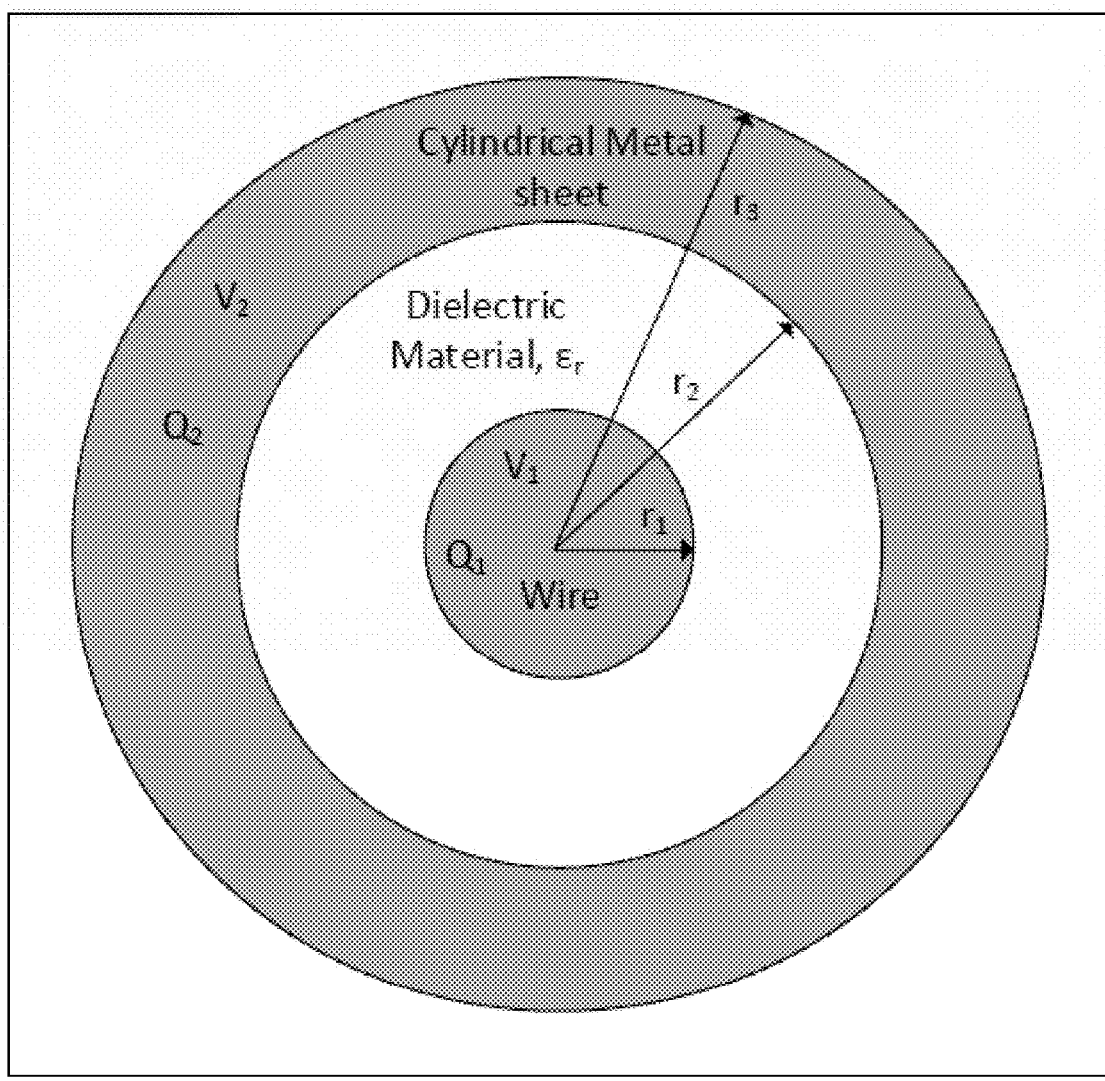
FIG. 5 illustrates the cross section of the inner and outer conductors of the device.

The first embodiment is illustrated in FIGS. 2A, 3 and 5. In the first embodiment, a static electrostatic generator (SEG) is described which comprises a thin conductive metal wire 220 having a first and a second end; a cylindrical conductive metal sheet 210 coaxial with the metal wire, the cylindrical conductive metal sheet having a first end and a second end, an interior surface and an exterior surface; a conductive metal sphere 230 surrounding the conductive metal wire and the cylindrical conductive metal sheet, the conductive metal sphere having an interior surface and an exterior surface, wherein the interior surface of the conductive metal sphere is evenly spaced from the exterior surface of the cylindrical conductive metal sheet (see FIG. 5).

The SEG has a first switch S1, a second switch S2 and a third switch S3, each switch having a first side and a second side; a battery having a first electrode and a second electrode, wherein the first electrode is connected to the first end of the metal wire and the second electrode is attached to the first side of the first switch. The second side of the first switch is connected to the first end of the cylindrical conductive metal sheet. The second switch has its first end connected to the second end of the conductive metal wire and its second end connected to the second end of the cylindrical conductive metal sheet. The third switch has its first end connected to the cylindrical conductive metal sheet and its second end connected to the interior surface of the conductive metal sphere.

A controller 250 is connected to each of the switches and includes timing circuitry 360 configured to operate the switches at specified times in order to generate electrostatic charges on the surface of the metal sphere.

There is an optional dielectric material between the conductive metal wire and the cylindrical conductive metal sheet. This dielectric material has relative permittivity, $\tau_r$, in the range of 1-10, and is selected from the group consisting of air, PTFE, polyethylene, polymide, polypropylene, polystyrene, aluminum oxide, ceramic, mica and glass. The optional dielectric material may be used to support the wire within the cylindrical conductive metal sheet.

The thin metal wire has a radius in the range of 0.001 to 2.0 mm, preferably 0.001 to 1.0 mm, more preferably 0.01 to 0.16 mm, even more preferably 0.04 to 0.08 mm.

The thin metal wire, cylindrical metallic sheet and the metal sphere are selected from the group consisting of copper, aluminum, tantalum, brass and gold.

The switches are selected from the group consisting of transistors, electrically actuated switches, or electrically actuated mechanical switches. When the switches are transistors, the transistors are preferably high power MOSFETS, but may optionally be selected from the group consisting of MOSFETS, JFETS, FETs, and bi-polar junction transistors (BJT).

The controller 350 includes a timing module connected to the switches and a microprocessor 380 connected to the timing module, the microprocessor having circuitry configured to control the timing module to turn the switches ON or OFF.

The battery may be a battery bank having a plurality of internal, switchable batteries. In this option, the controller has circuitry configured to adjust the voltage applied to the battery by switching the internal batteries of the battery bank to add or delete them from contributing to the voltage at the battery electrodes.

An optional voltage sensor 202 may be located on the external surface of the metal sphere and connected to the controller. The voltage sensor may be configured to make voltage measurements of the external surface of the metal sphere and send the measurements to the controller. The controller may use these measurements to set the switch timing. Alternatively, the switch timing may be entered at I/O interface 390 (see FIG. 3) for use by microprocessor 380.

A second embodiment to a method of generating static electrostatic charges is illustrated with respect to FIGS. 2A, 3, and 5. The method comprises connecting a first end of a thin conductive metal wire 220 to a first battery 240 electrode; connecting a first switch S1 between a second battery electrode and a first end of a cylindrical conductive metal sheet 210; connecting a second switch S2 between a second end of the conductive metal wire and a second end of the cylindrical conductive metal sheet; connecting a third switch between the cylindrical conductive metal sheet 210 and a conductive metal sphere 230.

The method includes operating the SEG by closing, by a controller 250, the first switch S1; opening, by the controller, the first switch, closing the second switch S2 and the third switch S3; wherein closing the second and third switches causes the conductive metal sphere to accumulate electrostatic charges. After a period of time, the second and third switches are opened. The first switch may again be closed, to accumulate a higher level of charge on the metal cylinder. After a designated charging time, the first switch is opened and the second and third switches are closed to accumulate more charge on the conductive metal sphere. After two charging sessions, the conductive metal sphere may be discharged by opening the second switch and third switch, and contacting the conductive metal sphere with a conductor (not shown).

The electrical polarity of the battery electrodes is operatively reversible, therefore either positive or negative charges can build on the conductive metal sphere. The controller is connected to the battery electrodes such that reversing the polarity of the battery electrodes, reverses the polarity of the electrostatic charges which accumulate on the surface of the metal sphere.

The battery 240 is optionally a battery bank having a plurality of internal, switchable batteries. In this option, the controller is connected to the internal batteries such that switching the internal batteries adjusts the voltage level of the battery.

The method includes measuring, by a voltage sensor 202, the voltage on an external surface of the metal sphere 230 and switching, by the controller, the internal batteries based on the voltage measurements to achieve a desired voltage input to the static electrostatic generator.

The method includes using a timing module 360 which is connected to a microprocessor 380 in the controller 350. The timing includes closing, by the timing module of the controller, the first switch at a time $\tau_1$, wherein closing the first switch causes equal and opposite charges to accumulate on the surfaces of the thin metal wire and the cylindrical metal sheet; opening the first switch at a time $\tau_2$, wherein $\tau_2$ is greater than $\tau_1$; then closing, by the controller, the second switch and the third switch at a time $\tau_3$, wherein $\tau_3$ is greater than $\tau_2$.

The conductive metal sphere accumulates electrostatic charges from time $\tau_3$ to time $\tau_4$, wherein $\tau_4$ is greater than $\tau_3$. After $\tau_4$ has passed, the second switch and third switch are opened and the conductive metal sphere may be discharged between times $\tau_4$ and $\tau_5$, where $\tau_5$ is greater than $\tau_4$. To discharge the conductive metal sphere, a conductor connected to ground or another device (not shown) may contact the conductive metal sphere.

Alternatively, the conductive metal sphere may be charged to a higher charge level by repeating the steps of closing the first switch. At time, $\tau_6$, the first switch is opened and the second switch and third switch are again closed, which allows more charges to accumulate on the sphere. As the static electrostatic generator is used to produce electrostatic charges for purposes outside of the scope of the present disclosure, using the charges discharges the metal sphere. When contacted by a conductor, the sphere discharges until time $\tau_7$. The controller then acts by opening the second switch and third switch at time $\tau_8$.

The time $\tau_4$ may be determined by the timing module 360. Alternatively, determining time $\tau_4$ may be based on the voltage sensor measurements, wherein $\tau_4$ is the time at which the voltage measurement is greater than a first threshold. The first threshold may be set at the I/O interface and is stored in a memory 370. The first threshold may preferably be set to be 10% less than the voltage level of the battery.

The opening, by the controller, of the second switch and third switch at time $\tau_5$, may also be determined by the time at which the voltage measured by the voltage sensor is less than a second threshold. The second threshold may be set at the I/O interface and stored in a memory 370. This second threshold may preferably be set to be 90% less than the voltage level of the battery.

The times $\tau_1$, and $\tau_3$, are received from an I/O interface 390 connected to the controller. The I/O interface may have buttons configured to control the switches manually.

The thin metal wire and conductive metal cylinder have known dimensions. The thin metal wire has a length $L_1$ and a radius $r_1$ and the cylindrical metal sheet has a length $L_2$ and a radius $r_2$. In the current embodiment, $L_1=L_2$, but may optionally have different lengths, which would affect the capacitance between the thin metal wire and conductive metal cylinder.

The microprocessor 380 of the controller has analysis circuitry configured for calculating the capacitance, which is based on the lengths $L_1$ and $L_2$ and the radii $r_1$ and $r_2$. The method includes calculating the time constant based on the capacitance and determining the time $\tau_2$ based on the sum of the time $\tau_1$ and five time constants.

The capacitance is calculated based on the equation:

$$C = \frac{2\pi\varepsilon 0 L}{\ln(r2/r1)}$$

where $\varepsilon_0=1$ for a vacuum, and is otherwise a known specification of the optional dielectric between the wire and the metal sheet. A time constant is calculated as the resistance times the capacitance. In this case, the resistance is provided by the resistance of the battery. Five time constants determine the amount of time necessary to fully discharge a capacitor. (See "Cylindrical Capacitor", http://www.phys.uri.edu/gerhard/PHY204/ts1105.pdf, incorporated herein by reference in its entirety).

The discharge time $\tau_7$ depends on the resistance of the conductor touching the metal sphere and is determined experimentally based on the amount of discharging resistance.

In general, when the cylindrical metal sheet is connected to a positive voltage source, and the metal wire is connected to a negative voltage source, the charges start to accumulate on the surfaces of the conductors. Since the surface area of the thin metal wire is much smaller than the surface area of the cylindrical metal sheet, more charge will accumulate on the cylindrical metal sheet. After charging both conductors with different amount of charges due to the surface area geometric differences between them, switch S1 is opened and the switches S2 and S3 are closed (see FIG. 2A). By closing S2, the number of charges on the thin wire will cancel the same number of charges on the cylindrical metal sheet. Since the electric field binding the remaining extra charges on the cylindrical metal sheet is gone when S2 and S3 are connected, the remaining charges on the cylindrical metal sheet are set free. Thus the number of free charges can be calculated by $$Q_{Free}=Q_{Cylinderical-Metal-Sheet}-Q_{Wire} \tag{1}$$

The free charges cannot move to the thin wire since the static charges are not allowed to be inside a metal. The metal sphere 230 acts as a charge collector as no static charges are allowed to exist inside a conductor. Charges on the metal sphere start to accumulate once the switches S2 and S3 are closed while S1 is opened. The metal sphere 230 prevents any voltage difference across S1 except for the battery voltage. Any enclosing metal surface will be sufficient to act as charge accumulator surface, whether spherical or cylindrical.

To estimate the SEG efficiency, firstly, the total energy stored (TES) within the SEG after it is fully charged must be calculated. Forcing the number of charges on the cylindrical metal sheet to equal the number of charges on the thin wire, the energy lost (EL) can be calculated. Thus, the efficiency, $\eta$, will be:

$$\eta = \frac{TES-EL}{TES}*100 \tag{2}$$

The SEG of the present disclosure has many advantages over existing electrostatic generators. It is capable of fast charge generation by utilizing fast switching transistors. Additionally, the SEG can generate either positive or negative charges by merely reversing the battery polarity. Moreover, it can control the number of charges generated by controlling the voltage and the switching time of the switches, such as transistors. Furthermore, no mechanical methods are required to generate the charges, thus is a static device. The efficiency of the SEG is as high as 46.95%, as will be shown in the results section where many different scenarios were tested to determine the device output and efficiency.

Simulation of the SEG is carried out in MATLAB using the Finite Difference Method (FDM), and the FEMM (Finite Element Method Magnetics), then using a Finite element Method (FEM), showing the results are comparable. (See D. C. Meeker, "Finite element method magnetics," Version 4.2, 2015, incorporated herein by reference in its entirety).

One of the numerical solutions used in simulating the SEG is the Finite difference method, FDM. FDM is one of the numerical solution methods used to solve complex problems that are difficult to solve analytically or by linearizing differential equations. (See M. N. Sadiku, Numerical Techniques in Electromagnetics with MATLAB. CRC Press, Apr. 9, 2009, incorporated herein by reference in its entirety). It is a numerical approximation solution that converts differential equations to finite difference equations, and through iterations of algebraic equations, a solution of a complex differential equation can be obtained. (See J. D. Kraus, Electromagnetics. McGraw-Hill Companies, Jul. 1, 1992; and D. K. Cheng, Field and Wave Electromagnetics. Addison-Wesley Educational Publishers Inc., 1983, each incorporated herein by reference in their entirety).

Laplace's equation and Poisson's equation are powerful tools to represent an electrostatic system. Solving these differential equations for complex geometry in order to represent the behavior of the electrostatic model must be carried through a numerical solution. There are many methods of finite difference method can be applied to solve for Laplace's and Poisson's equations, the method used in the present disclosure for finite difference is the Five-point star (leapfrog). (See J. R. Nagel, "Numerical solutions to Poisson equations using the finite-difference method [education column]," IEEE Antennas and Propagation Magazine, Vol. 56, No. 4, pp. 209-224, August 2014; and M. N. Sadiku et al. (2009), each incorporated herein by reference in their entirety).

A. LaPlace's Equation

To solve the differential equation of the SEG, the differential equation must be converted to a finite difference equation $$\nabla \cdot D=0 \tag{3}$$

since $$D=\varepsilon_0 \varepsilon_r E \tag{4}$$

then $$\nabla \cdot [\varepsilon_0 \varepsilon_r E]=0 \tag{5}$$

$$\nabla^2 V=0 \tag{6}$$

since $$\nabla^2 = \frac{\partial^2}{\partial x^2}+\frac{\partial^2}{\partial y^2}+\frac{\partial^2}{\partial z^2} \tag{7}$$

where D is the flux density and $\nabla \cdot D$ is the divergence of the flux density.

Permittivity describes the amount of charge needed to generate one unit of electric flux in a particular medium. Accordingly, a charge will yield more electric flux in a medium with low permittivity than in a medium with high permittivity. Permittivity E is the measure of a material's ability to store an electric field in the polarization of the medium. The permittivity of a dielectric medium is often represented by the ratio of its absolute permittivity to the electric constant. This dimensionless quantity is called the relative permittivity of the medium, sometimes also called "permittivity". Relative permittivity $\varepsilon_r$ is also commonly referred to as the dielectric constant. The permittivity in a vacuum is denoted by $\varepsilon_0$. The relative permittivity is related to the permittivity and the permittivity in a vacuum by the expression: $\varepsilon_r = \varepsilon/\varepsilon_0$.

Under the assumption that there are no changes in the z-components (lengths of the conductors), and the problem is to solve for x and y, based on:

$$\nabla^2 V = \frac{\partial^2 V}{\partial x^2} + \frac{\partial^2 V}{\partial y^2} \qquad (8)$$

Figure 4A:
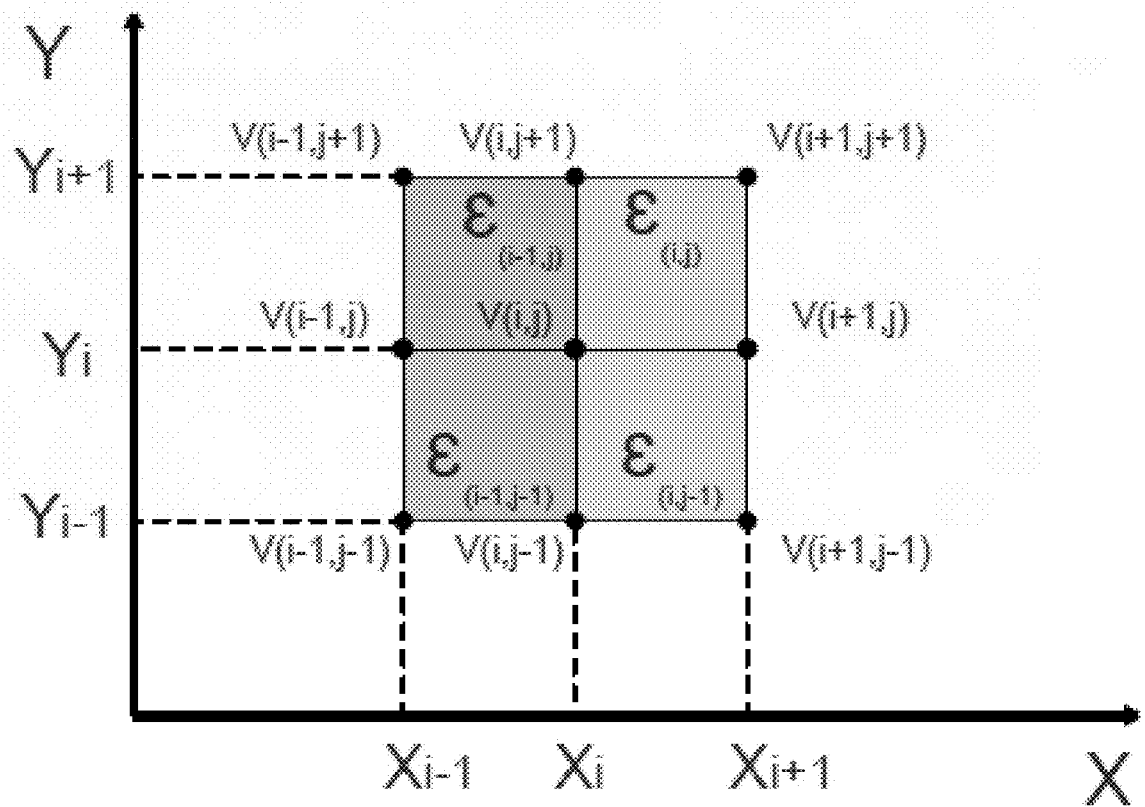
FIG. 4A is a graph illustrating the electric field mesh selection for simulation of the SEG.

To solve the Laplace differential equation, first the area of interest for study and simulation of the behavior of electrostatic field must be divided into a fine mesh using the five-point star configuration shown in FIG. 4A. The mesh areas are plugged into equation (8) to yield:

$$\frac{\partial^2 V}{\partial x^2} \cong \frac{V_{(i+1,j)} - 2V_{(i,j)} + V_{(i-1,j)}}{h^2} \qquad (9)$$

$$\frac{\partial^2 V}{\partial y^2} \cong \frac{V_{(i,j+1)} - 2V_{(i,j)} + V_{(i,j-1)}}{h^2} \qquad (10)$$

Since the grid is uniform:

$$\nabla^2 V = \frac{V_{(i+1,j)} + V_{(i-1,j)} + V_{(i,j+1)} + V_{(i,j-1)} - 4V_{(i,j)}}{h^2} = 0 \qquad (11)$$

$$v_{(i,j)} = \frac{1}{4}[V_{(i+1,j)} + V_{(i-1,j)} + V_{(i,j+1)} + V_{(i,j-1)}] \qquad (12)$$

for varying dielectrics:

$$a_0 = \varepsilon(i, j) + \varepsilon(i-1, j) + \varepsilon(i, j-1) + \varepsilon(i-1, j-1) \qquad (13)$$

$$a_1 = \frac{1}{2}[\varepsilon(i, j) + \varepsilon(i, j-1)] \qquad (14)$$

$$a_2 = \frac{1}{2}[\varepsilon(i-1, j) + \varepsilon(i, j)] \qquad (15)$$

$$a_3 = \frac{1}{2}[\varepsilon(i-1, j-1) + \varepsilon(i-1, j)] \qquad (16)$$

$$a_4 = \frac{1}{2}[\varepsilon(i, j-1) + \varepsilon(i-1, j-1)] \qquad (17)$$

$$-a_0 V(i, j) + a_1 V(i+1, j) + \qquad (18)$$
$$a_2 V(i, j-1) + a_3 V(i-1, j) + a_4 V(i, j+1) = 0$$

$$V(i, j) = \qquad (19)$$
$$\frac{1}{a_0}[a_1 V(i+1, j) + a_2 V(i, j-1) + a_3 V(i-1, j) + a_4 V(i, j+1)]$$

where V is the electric potential at a point in the simulation, h is the distance between two points in the simulation, and as the simulation is divided equally along the x-axis and y-axis, $h_x = h_y = h$. In equations (13)-(19), $\alpha_0$ is the equivalent dielectric between four dielectric materials at point (i,j), $\alpha_1$ is the equivalent dielectric between two dielectric materials at point (i+1,j), $\alpha_2$ is the equivalent dielectric between the two dielectric materials at point (i,j-1), $\alpha_3$ is the equivalent dielectric between the two dielectric materials at point (i-1,j) and $\alpha_4$ is the equivalent dielectric between the two dielectric materials at point (i,j+1).

B. Poisson's Equation

By using Poisson's equation, the charges on each plate can be calculated, since $$\nabla \cdot D = \rho_c \qquad (20)$$

where $\rho_c$ is the surface charge density.

C. Electric Field

To calculate the electric field:

$$-a_0 V(i, j) + a_1 V(i+i, j) + a_2 V(i, j-1) + \qquad (21)$$
$$a_3 V(i-1, j) + a_4 V(i, j+1) = -\frac{Q(i, j)}{\varepsilon_0}$$

$$E = -\nabla V \qquad (22)$$

$$E = -\hat{x}\frac{\partial V}{\partial x} - \hat{y}\frac{\partial V}{\partial x} \qquad (23)$$

$$E = E_x(i, j) + E_y(i, j) \qquad (24)$$

$$E_x(i, j) = -\frac{V(i+1, j) - V(i, j)}{h} \qquad (25)$$

$$E_y(i, j) = -\frac{V(i, j+1) - V(i, j)}{h} \qquad (26)$$

where $\hat{x}$ and $\hat{y}$ denote the normalized vectors of x, y.

After obtaining the potential for each point on the unified mesh, the electric field can be calculated using the gradient function in MATLAB. The magnitude of the net electric field can be calculated as $$E = \sqrt{E_x^2 + E_y^2} \qquad (27)$$

After obtaining the electric field, the energy for each cell in the mesh can be calculated using $$\text{Energy} = \tfrac{1}{2}\varepsilon_0 E^2 V_{cell} \qquad (28)$$

Figure 4B:
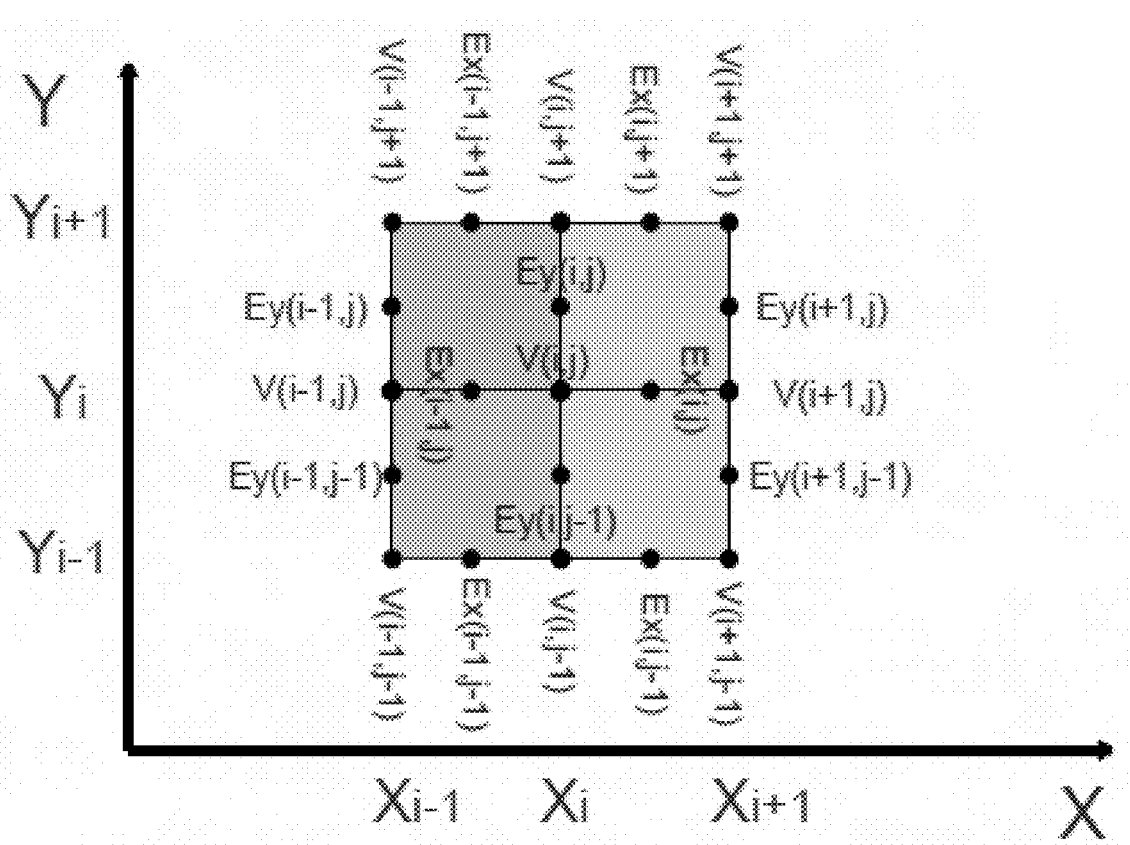
FIG. 4B is a graph illustrating the electric field interaction of the SEG.

FIG. 4B is a graph illustrating the electric field interaction of the SEG.

IV. Simulation Results

The simulation of the SEG was carried out in MATLAB using FDM and FEMM software. The SEG and its dimensions are shown in FIG. 5 and Table 1. The column "Dimension of the simulated volume" refers to the electric field/potential extents as graphed in FIG. 6-17. Z is the length of the metal cylinder respectively, as used in the simulation.

TABLE 1

Parameters of the SEG and the simulation

| Dimension of the simulated volume | | |
| --- | --- | --- |
| X [mm] | Y [mm] | Z [mm] |
| 20 | 20 | 100 |

| Device parameters | | | | |
| --- | --- | --- | --- | --- |
| $r_1$ (mm) | $r_2$ (mm) | $r_3$ (mm) | $\varepsilon_r$ | $V_{DC}$(Volt) |
| 0.04 | 1 | 1.1 | 1 | 1000 |

As $r_3$ is only 0.1 mm greater than $r_2$, a structural support may be used within the interior of the metal sphere to hold the metal sphere and the cylindrical metal sheet at the proper spacing. This structural support may be a dielectric which configured to provide structural support of the wire and cylindrical metal shield spacing. Any dielectric material with minimum thickness to withstand the applied voltage can be used to support the metal cylinder and the thin wire and insulate them from the metal sphere.

To determine the number of charges freed from the outer metal sheet, a voltage must be applied between the wire and the metal sheet (see Table 2, Case 0). The difference in the number of charges between the wire and the metal sheet, which is due to the area geometric difference between both of the conductors, is the number of free charges.

The calculations used to determine the charges on the sphere are now presented.

The known constant values are the potential applied to each conductor. For simplicity, two spheres with different radii, a and b, and separation distance d are used. The potential of a single sphere of radius r is given by:

$$V = \frac{Q}{4\pi\varepsilon_0 r}$$

Since $-V_1=V_2$, (see battery 240, FIG. 2A) and the radii of spheres are a and b, then $$\frac{Q_1}{4\pi\varepsilon_0 a} = \frac{Q_2}{4\pi\varepsilon_0 b}$$

Therefore, $$Q_2 = Q_1 \frac{b}{a}$$

If the radius b>a, then the amount of charge accumulated on the sphere with radius b is greater than the amount of charge accumulated on the sphere with radius a. This example shows that different geometric spheres with different areas could accumulate different charges. (See "Field and Wave Electromagnetics" book by David K. Cheng, chapter 3 pages (104-105) ISBN: 0-201-01239-1, incorporated herein by reference in its entirety). A similar analysis applies to plane conductors with different geometry as well as to cylindrical conductors. For the cylindrical capacitor of the present disclosure, the voltage is held constant, thus the amount of charge varies depending on the geometry of the thin wire and the metal cylinder. The electric field of a cylindrical wire is given by:

$$E = \frac{Q_0}{2\pi\varepsilon_0 L r}$$

where L is the length of the wire and r is the radius. Thus, the voltage is given by:

$$V = \frac{Q}{2\pi\varepsilon_0 L} \ln r$$

Since the voltages $-V_1=V_2$, and the radii of the thin wire and the metal cylinder are a and b respectively, $$\frac{Q_1}{2\pi\varepsilon_0 L} \ln a = \frac{Q_2}{2\pi\varepsilon_0 L} \ln b$$

Therefore, $$Q_2 = Q_1 \frac{\ln a}{\ln b}$$

In a non-limiting example, simulation is performed using $a=0.04$ mm and $b=1$ mm. This yields:

$Q_2=1.47 Q_1$ or $Q_1=0.68 Q_2$

Reference to Table 2 shows that the simulation of Case 0 results in:

$Q_1=0.55\ Q_2$

The difference in the values are due to the numerical error associated with the simulation method. Increasing the number of points taken by the simulation yields a result very close number to the analytical solution.

In design, the diameter of the thin wire should be as small as possible for optimum operation. The spacing between the thin metal wire and the metal cylinder is dependent on the applied voltage and the breakdown voltage of the dielectric between the thin metal wire and the metal cylinder. For example, the break down voltage of air is 3 kV/mm, (dependent on temperature and humidity). Thus, the optimum distance between the thin wire and the metal cylinder is 1 mm if the applied voltage is 3 kV. The breakdown voltage is not an absolute value, as it is dependent on the temperature and humidity, thus during simulation the applied voltage was set at 1 kV for 1 mm spacing. If the spacing increases the voltage must increase as well to maintain the optimum operation of the device.

Figure 6:
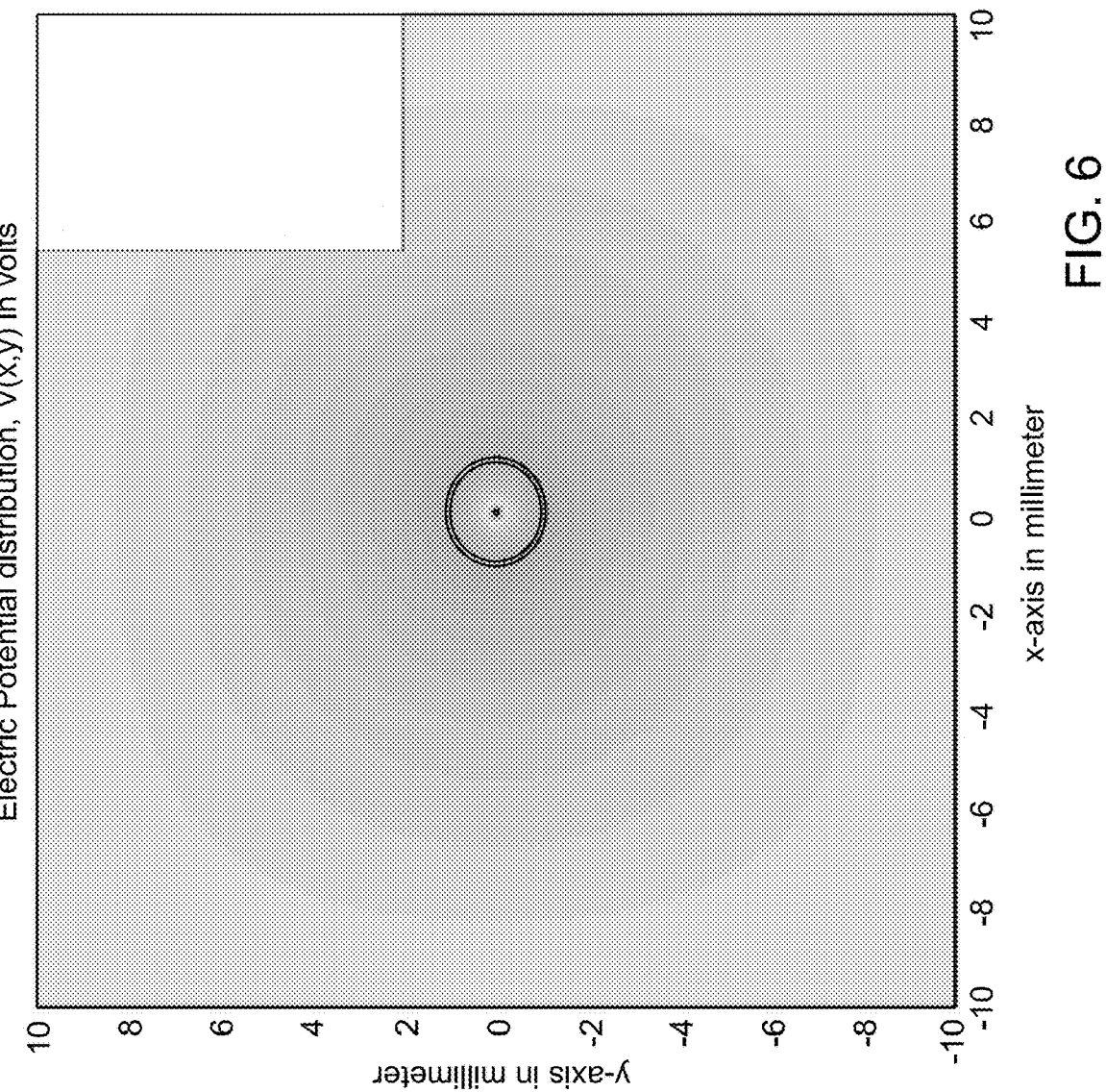
FIG. 6 illustrates the electric potential distribution of the device.
Figure 7:
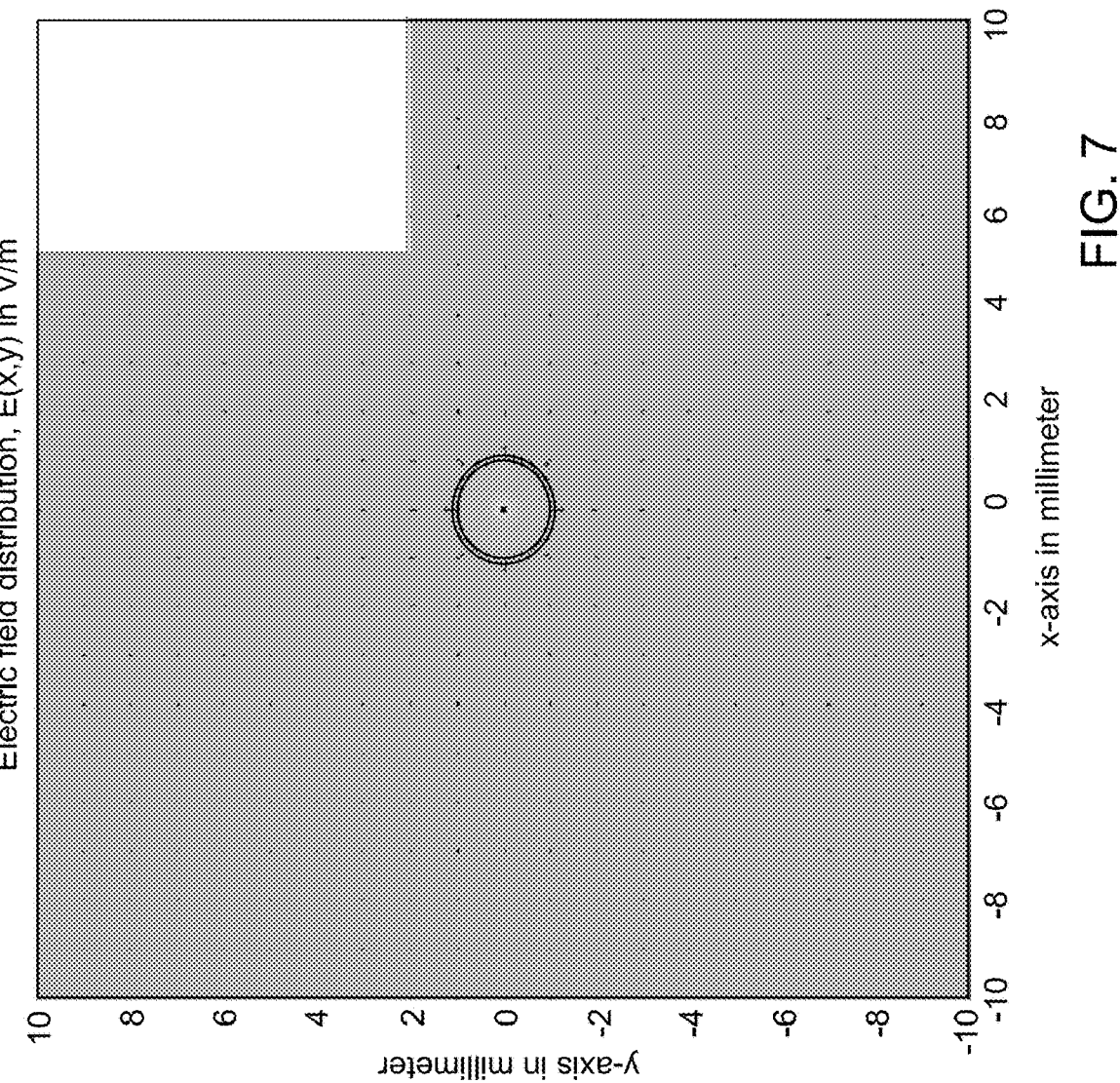
FIG. 7 illustrates the electric field distribution of the device.

FIG. 6 shows the electric potential distribution of the SEG. FIG. 7 shows the electric field distribution of the SEG.

To estimate the efficiency of the SEG, an equal amount of the charges are forced on both the wire and the metallic sheet, which is the number of charges on the thin wire since those charges will be canceled out with an equal number of charges on the metallic sheet. By comparing the total amount of energy stored within the SEG with the amount of energy associated with an equal number of charges, the efficiency of the SEG can be calculated. Thus by forcing $$Q_2 = -Q_1 \qquad (29)$$

and by calculating the energy associated with the charges, the efficiency can be calculated, as shown in equation (2).

A. Case I: The Effect of Dielectric Material

Figure 8:
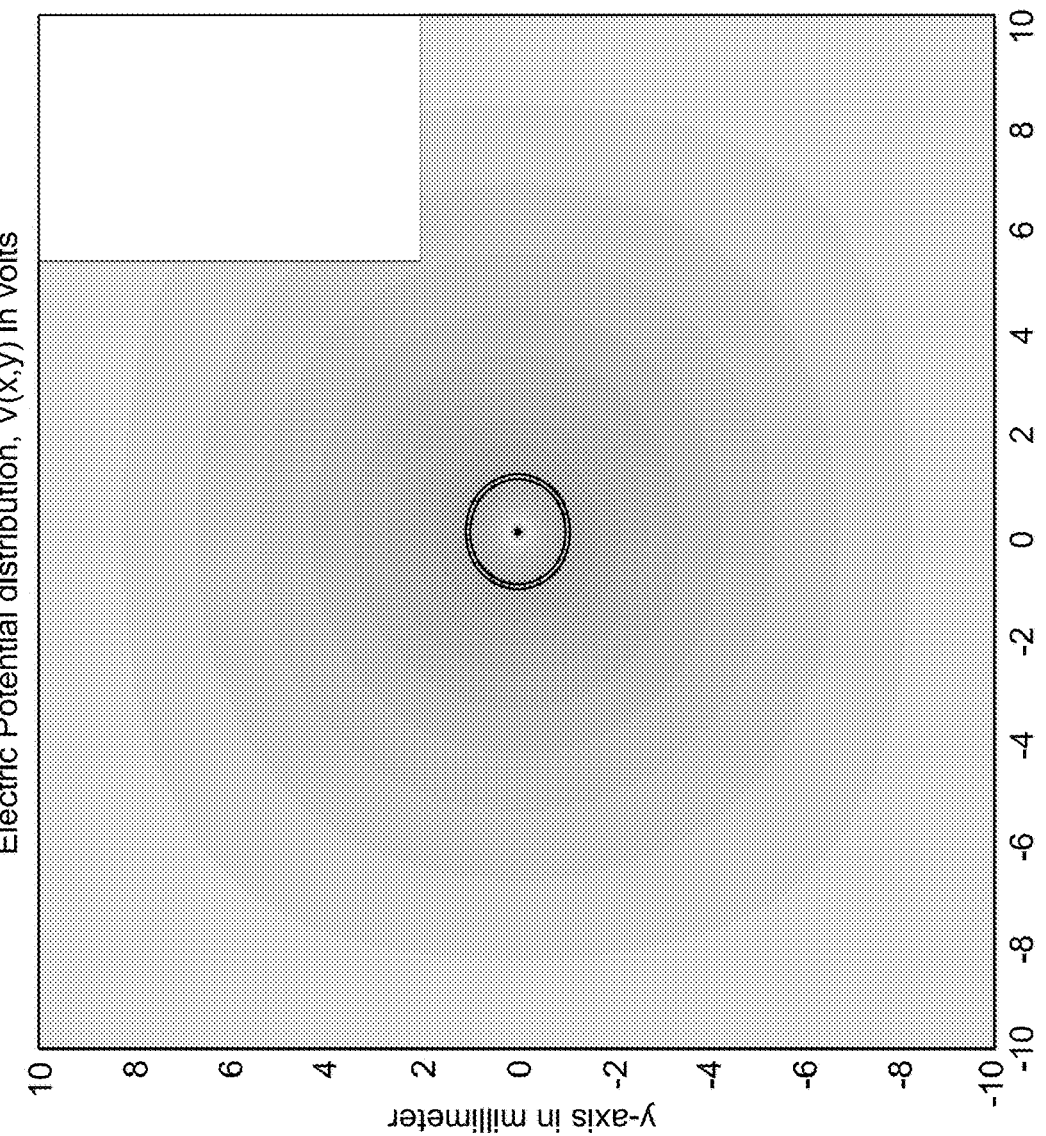
FIG. 8 illustrates the electric potential distribution of the device when $\varepsilon_r=10$.
Figure 9:
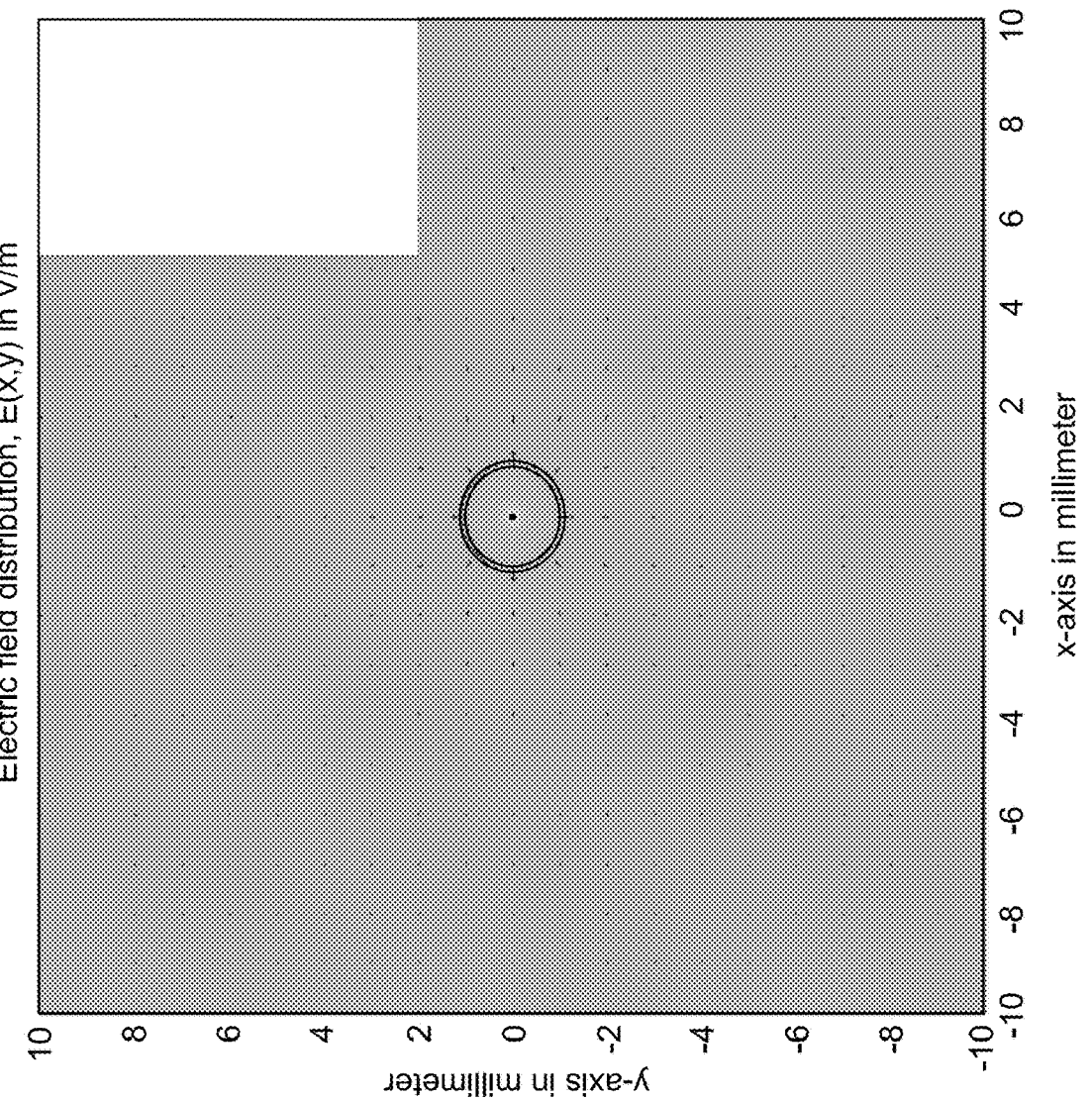
FIG. 9 illustrates the electric field distribution of the device when $\varepsilon_r=10$.

In this case, the dielectric material between the conductors is replaced with a material which has $\varepsilon_r=10$, to study the effects on charges production and the efficiency of the SEG, see Table 2 Case I. FIG. 8 shows the electric potential distribution of the SEG when $\varepsilon_r=10$. FIG. 9 shows the electric field distribution of the SEG when $\varepsilon_r=10$.

In Table 2, the column for Case I shows that the number of freed charges is slightly lower, and the efficiency of the SEG drops dramatically. This is due to the loss of the energy stored within the dielectric material.

B. Case II: The Effect of Applied Voltage

Figure 10:
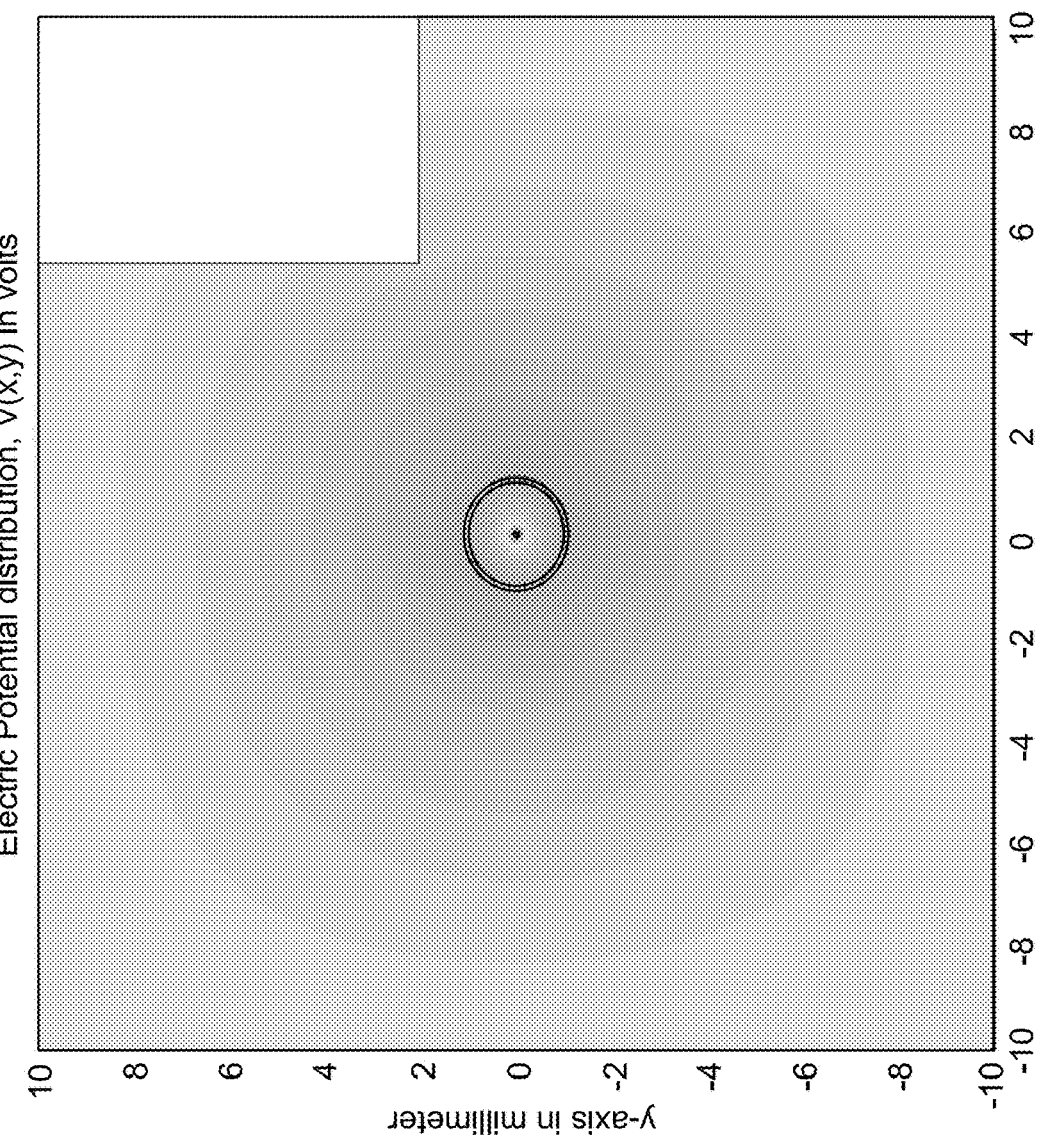
FIG. 10 illustrates the electric potential distribution of the device when the voltage is halved.
Figure 11:
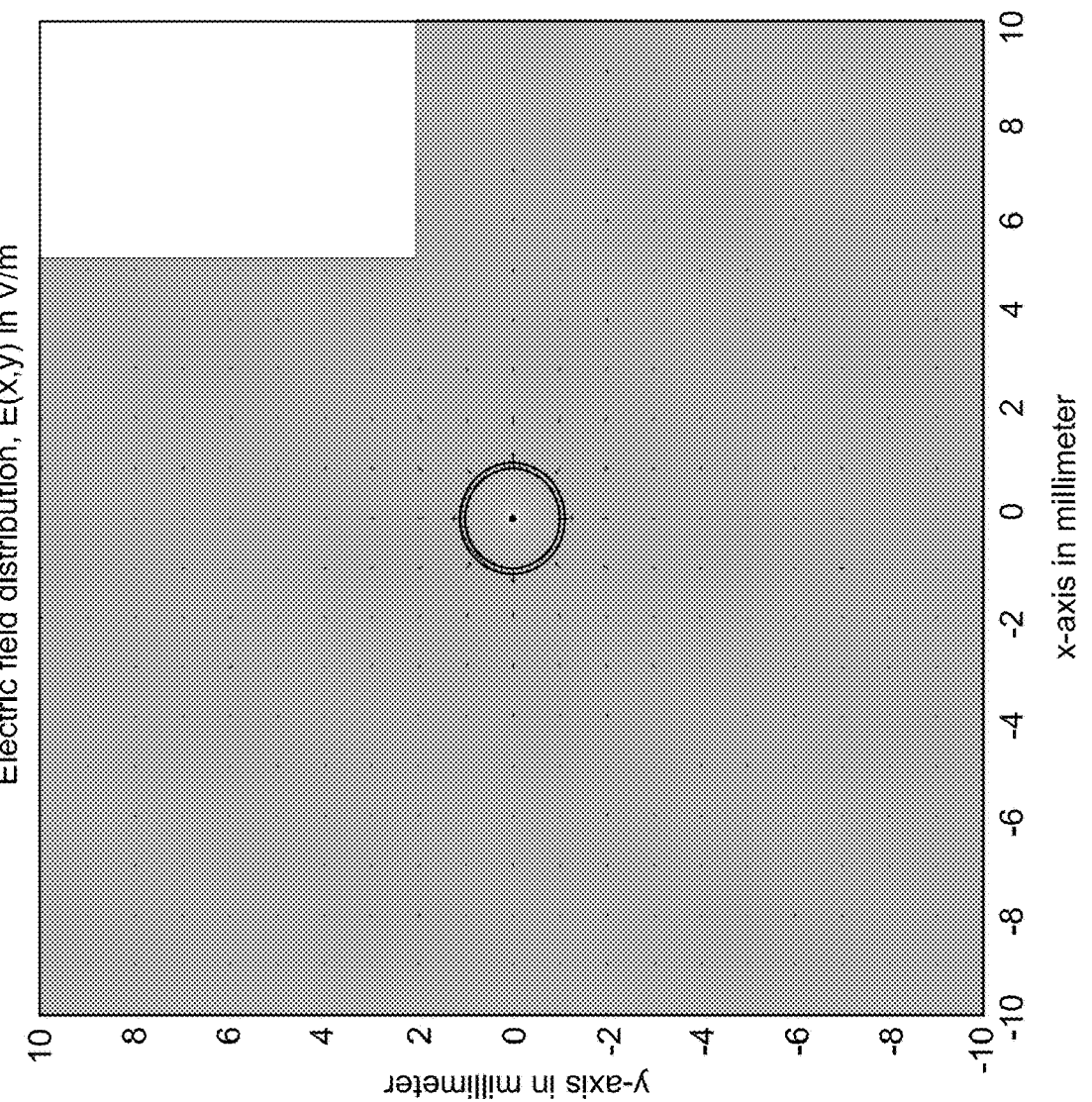
FIG. 11 illustrates the electric field distribution of the device when the voltage is halved.

In this case, the applied voltage between the conductors is reduced by half of the original value (500V) to study the effect on charge production and the efficiency of the SEG, as shown in Table 2 in the column for Case II. FIG. 10 shows the electric potential distribution of the SEG. FIG. 11 shows the electric field distribution of the SEG.

Table 2, Case II, shows that the number of freed charges and the efficiency dropped to about half of the values of Case 0. Thus a higher potential (Case 0) improves both the efficiency of the SEG and the number of generated charges. The breakdown voltage and the maximum switching voltage must be considered in the design.

C. Case III: The Effect of the Diameter of the Thin Wire

Figure 12:
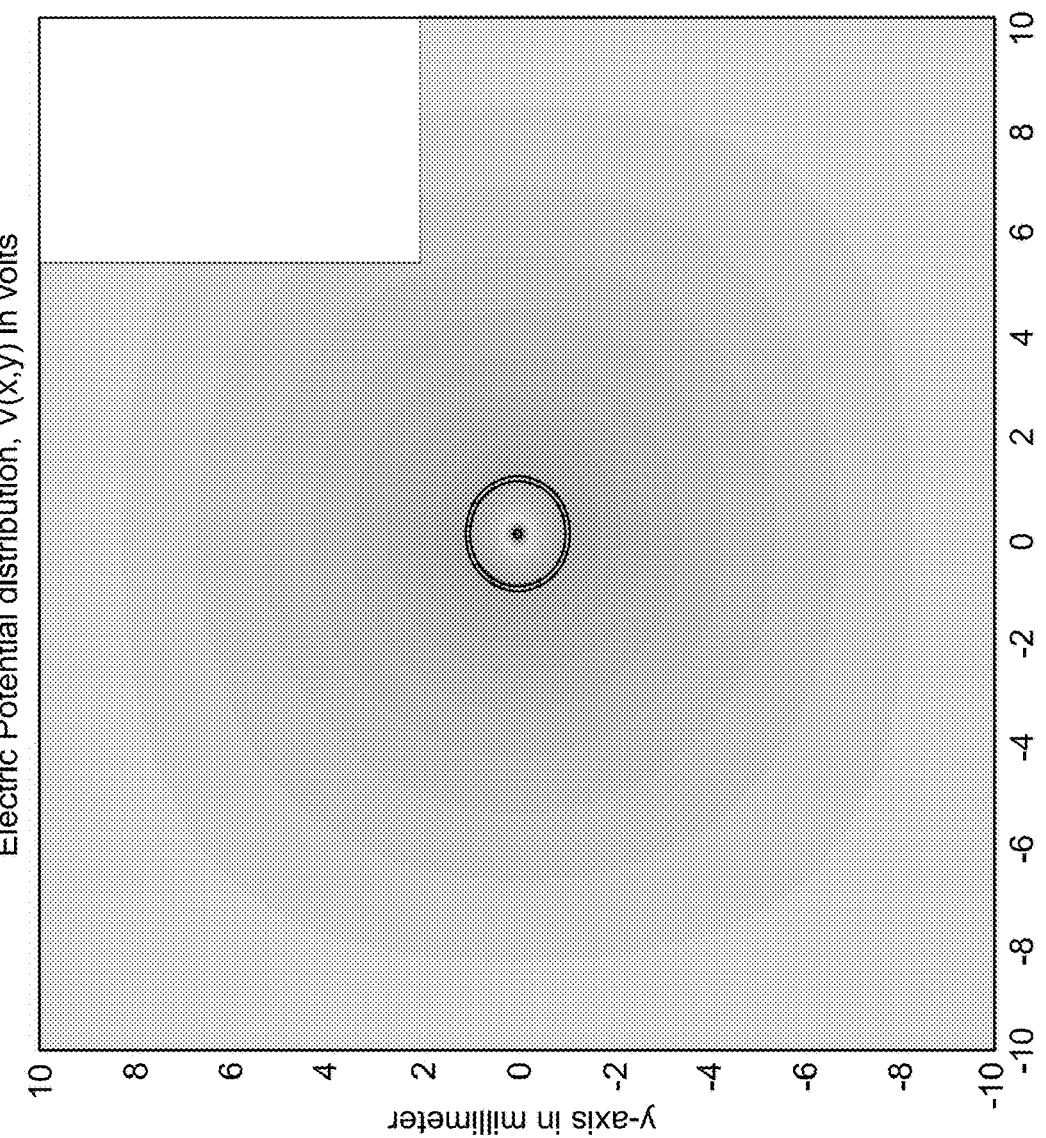
FIG. 12 illustrates the electric potential distribution of the device when the diameter of the thin wire is doubled.
Figure 13:
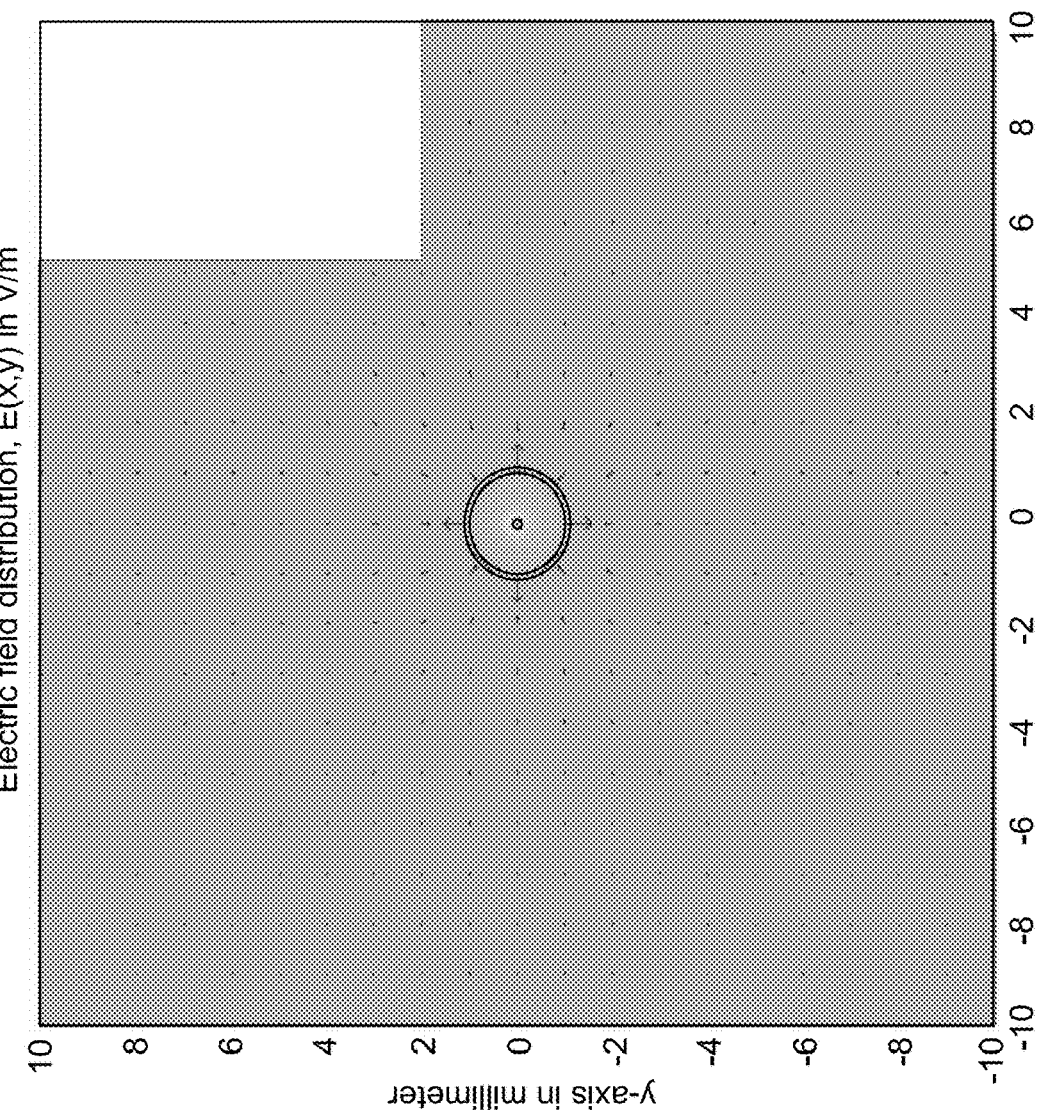
FIG. 13 illustrates the electric field distribution of the device when the diameter of the thin wire is doubled.

In this case, the diameter of the thin wire is doubled to study the effect on the charge production and the efficiency of the SEG, as shown in Table 2, Case III. FIG. 12 shows the electric potential distribution of the SEG. FIG. 13 shows the electric field distribution of the SEG.

Table 2, Case III, shows that the number of freed charges is slightly higher due to the slight decrement of distance between the conductors, while the efficiency of the SEG drops dramatically.

D. Case IV: The Effect of the Thin Metal Sheet Diameter

Figure 14:
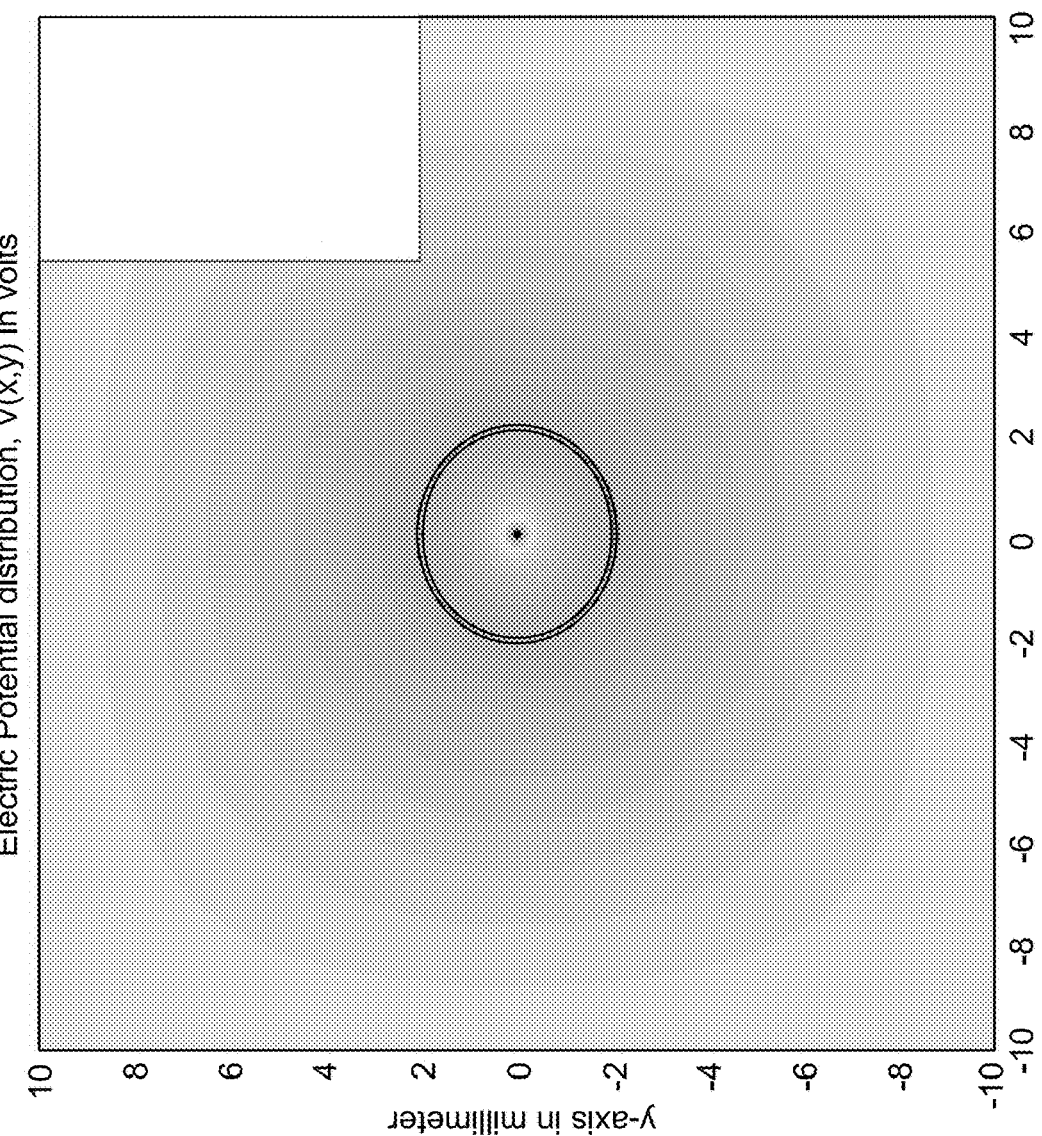
FIG. 14 illustrates the electric potential distribution of the device.
Figure 15:
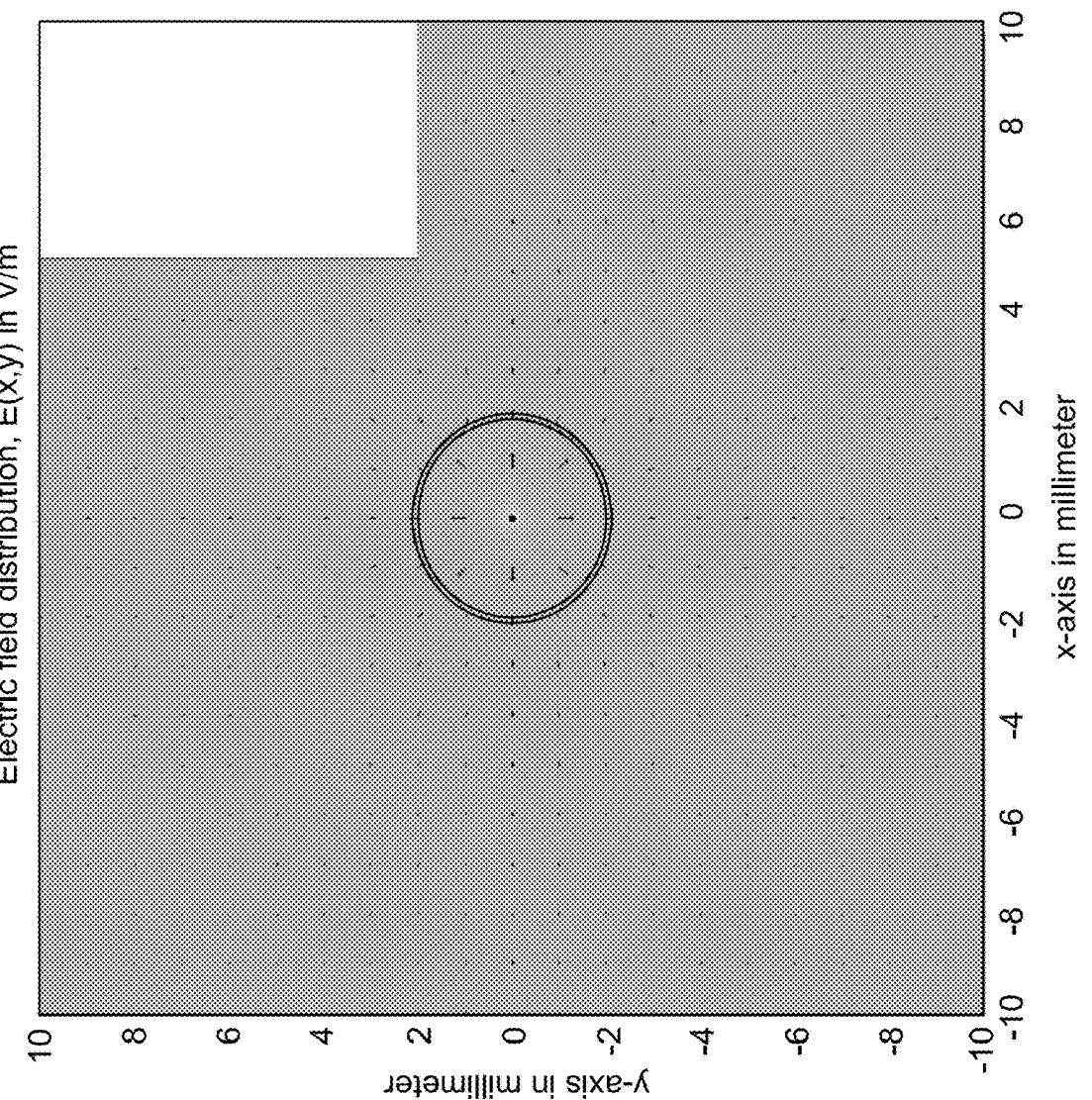
FIG. 15 illustrates the electric field distribution of the device.

In this case, the radii of the cylindrical metal sheet and the metallic sphere are doubled to study the effects on charge production and the efficiency of the SEG, see Table 2, Case IV. FIG. 14 shows the electric potential distribution of the SEG for $r_2=1$, $r_3=2.1$. FIG. 15 shows the electric field distribution of the SEG for $r_2=1$, $r_3=2.1$.

Table 2, Case IV, shows that the number of freed charges increases due to the increase in surface area of the thin metal sheet, while the efficiency of the SEG is slightly decreased.

E. Case V: The Effect of Metal Sheet Thickness

Figure 16:
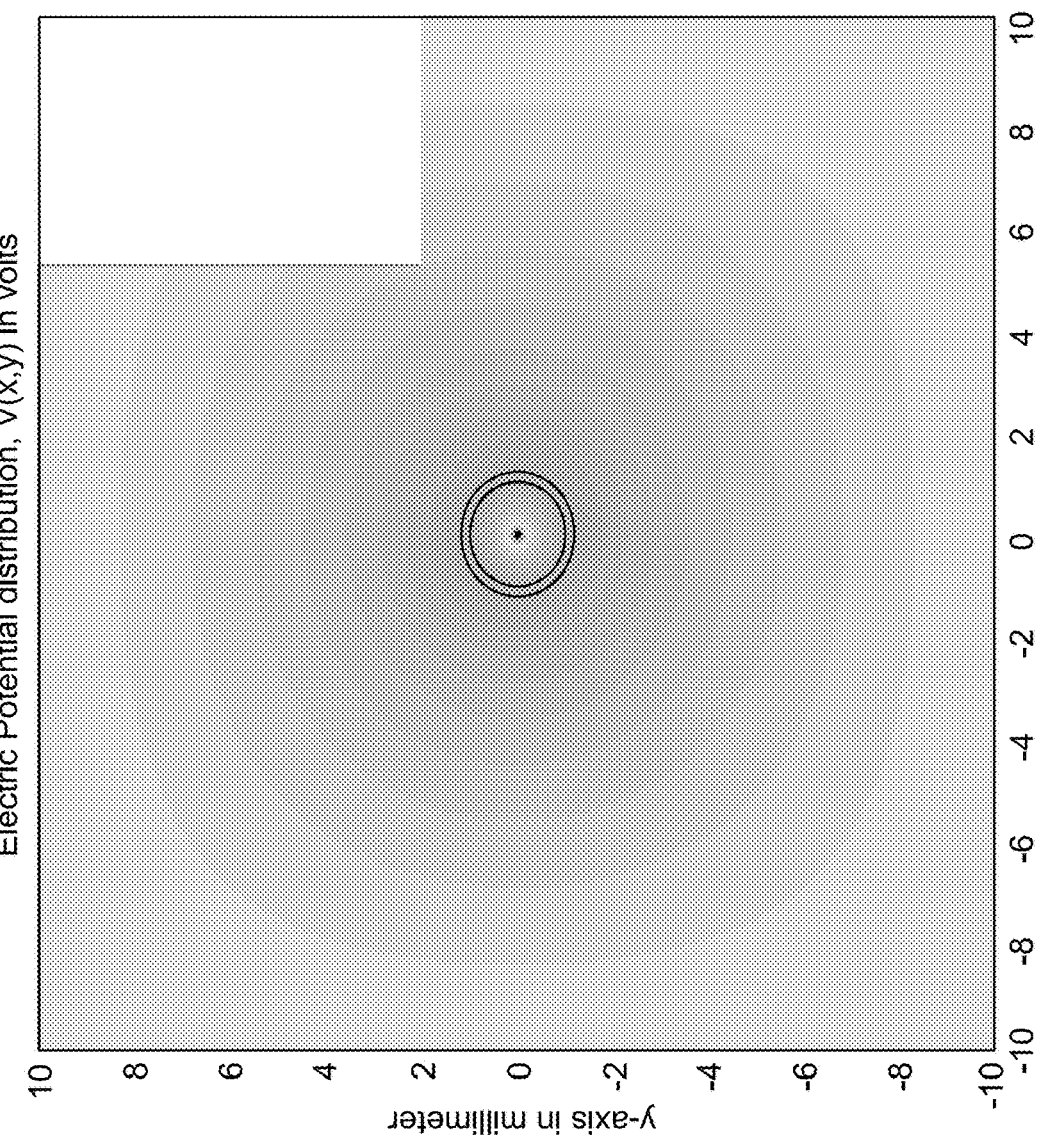
FIG. 16 illustrates the electric potential distribution of the device.
Figure 17:
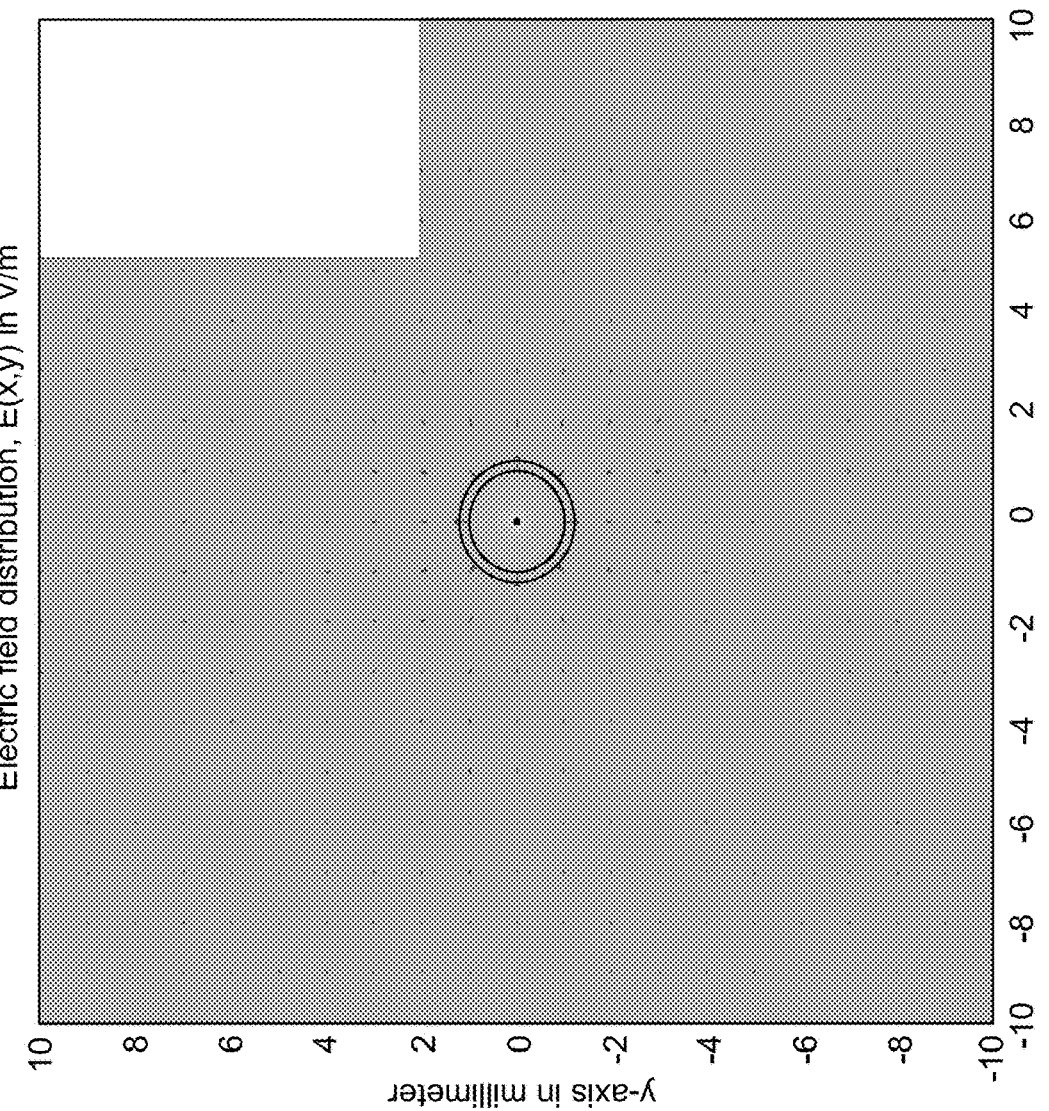
FIG. 17 illustrates the electric field distribution of the device.

In this case, the thickness of the thin metal sheet is doubled to study the effects on charges production and the efficiency of the SEG, see Table 2 Case V. FIG. 16 shows the electric potential distribution of the SEG for doubled thickness. FIG. 17 shows the electric field distribution of the SEG for doubled thickness.

Table 2, Case V, shows that the number of freed charges is slightly lower than for Case 0, because the number of charges on the thin wire are slightly higher while the charges on the metal sheet are slightly lower. This will lead to lower freed charges and lower efficiency. The greater the thickness of the cylindrical metal sheet, the greater the number of charges which accumulate, which leads to higher energy stored within the SEG.

From the previous results, the optimum design of the SEG must have higher metal sheet area for the cylindrical metal sheet, while the area of the thin metal wire must be as small as possible. In addition, the applied voltage must be as large as possible, taking into account the breakdown voltage and the maximum voltage specifications of the switches or transistors. Furthermore, the thickness of the cylindrical metal sheet must be as small as possible, so fewer charges are retained on the thin metal sheet and lower energy is stored within the SEG.

In summary, a static electrostatic generator (SEG) has been described with an efficiency reaching up to 46.95%, especially in the case of ideal switching transistors. The SEG consists of a thin wire and a thin metallic sheet enclosed by a metal sphere to act as a charge collector. The SEG can generate negative or positive charges by simply reversing the polarity of the DC voltage source. The freed charges are transferred to the metal surface of the sphere very quickly, yielding a set amount of charge with each switching operation. The amplitude of the DC voltage and the geometric design of the SEG can control the amount of charge on the surface of the sphere. Thus, if a set amount of charge is required to be deposited on the enclosed metal, these charges must be a multiplication of each set generated. Therefore, the SEG gives a certain degree of control over how much charge can be on the enclosed metal surface. The efficiency of the SEG is heavily dependent on the applied voltage and the geometric design. This SEG is a relatively simple design, static, controllable, lightweight, small, and does not require any mechanical moving parts, which is a big advantage over many other electrostatic generators.

The SEG of the present disclosure may be used to power a variety of electrical devices. For example, photocopiers, ionizers, paint sprayers, defibrillators and some air fresheners use static electricity.

In a non-limiting example, the SEG of the present disclosure may be used as an ionizer to clean the air in an enclosure. The SEG may charge air molecules in air. These charged air molecules attract dust or dirt in the air. The charged air molecules and dust or dirt bond together to form dense particles which fall to the bottom surface of the enclosure, and which can be vacuumed or otherwise removed from the bottom surface.

TABLE 2

Parameters and output of the SEG

| | Case 0 | Case 1 | Case II | Case III | Case IV | Case V |
|---|---|---|---|---|---|---|
| $V_1$ (Volt) | 500 | 500 | 250 | 500 | 500 | 500 |
| $V_2$ (Volt) | −500 | −500 | −250 | −500 | −500 | −500 |
| $\varepsilon_r$ | 1 | 10 | 1 | 1 | 1 | 1 |
| $r_1$ (mm) | 0.04 | 0.04 | 0.04 | 0.08 | 0.04 | 0.04 |
| $r_2$ (mm) | 1 | 1 | 1 | 1 | 2 | 1 |
| $r_3$ (mm) | 1.1 | 1.1 | 1.1 | 1.1 | 2.1 | 1.2 |
| $Q_1$ (Coulombs) | 1.74644e−9 | 1.73631e−8 | 8.7322e−10 | 2.19035e−9 | 1.3409e−9 | 1.77257e−9 |
| $Q_2$ (Coulombs) | −3.22398e−9 | −1.88247e−8 | −1.61199e−9 | −3.66845e−9 | −3.4159e−9 | −3.13439e−9 |
| $Q_{free}$ (Coulombs) | −1.47754e−9 | −1.4616e−9 | −7.3877e−10 | −1.4781e−9 | −2.075e−9 | −1.36182e−9 |
| Energy Stored (J) | 1.17827e−6 | 9.03654e−6 | 2.94569e−7 | 1.41549e−6 | 1.14532e−6 | 1.19127e−6 |
| When Q1 = −Q2 | | | | | | |
| Energy Stored (J) | 6.25078e−7 | 8.63198e−6 | 2.18325e−7 | 1.0802e−6 | 6.2438e−7 | 8.98687e−7 |
| Efficiency | 46.950% | 4.48% | 25.88% | 23.69% | 45.48% | 24.56% |

In a further non-limiting example, static electricity from the SEG may be used to create a spark between the SEG and a conductive element of an electrical circuit. The spark may act as a timer to initiate an operation in the electrical circuit.

Figure 18:
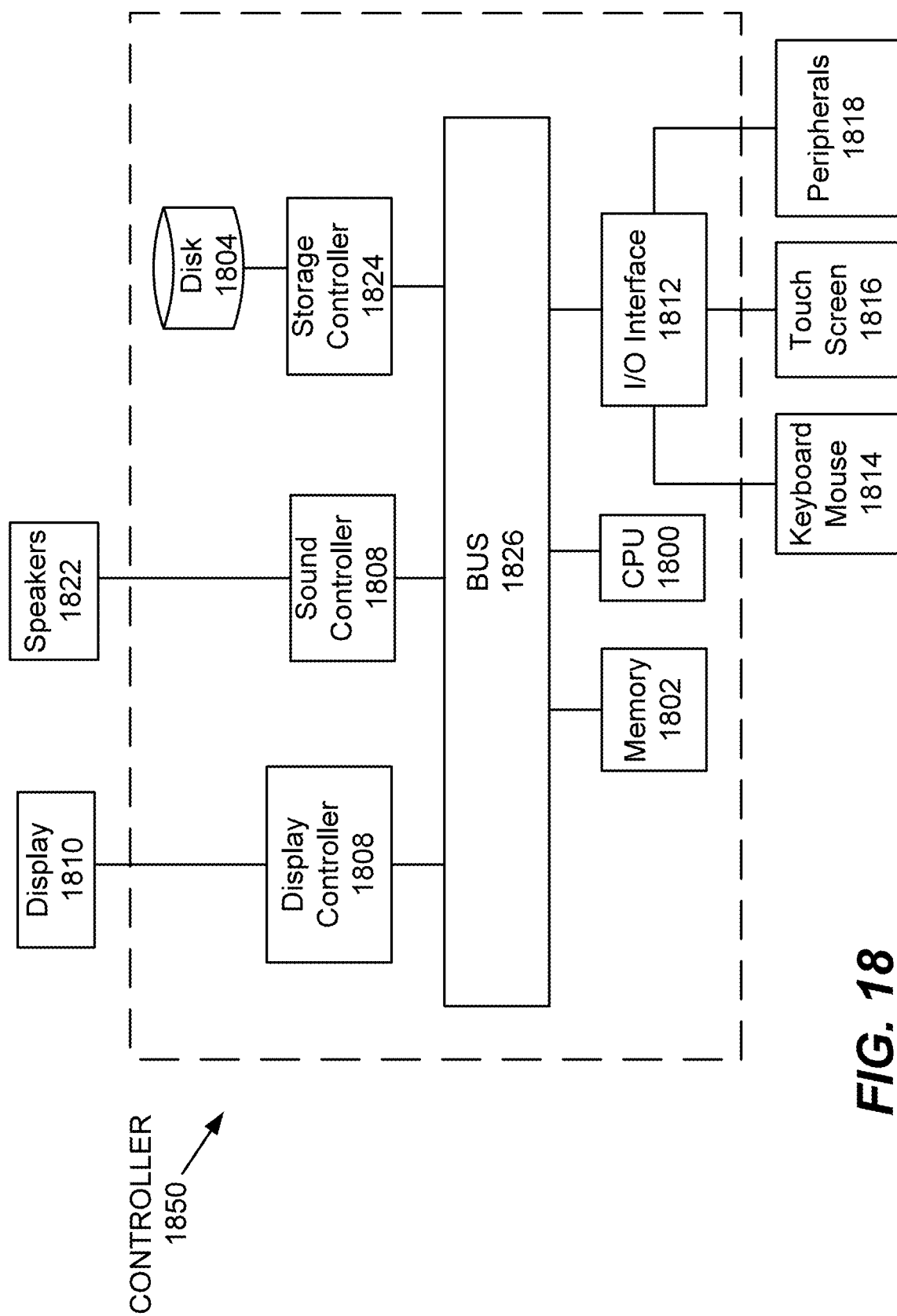
FIG. 18 is an illustration of a non-limiting example of a controller, according to certain embodiments.

Next, a hardware description of the controller 350 according to exemplary embodiments is described with reference to FIG. 18. In FIG. 18, the controller described is representative of the controller 350 of FIG. 3, in which the controller is a computing device which includes a CPU 1800 which performs the processes described above/below. The process data and instructions may be stored in memory 1802. These processes and instructions may also be stored on a storage medium disk 1804 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 1800 and an operating system such as Microsoft Windows 7, UNI7, Solaris, LINUX7, Apple MAC-OS and other systems known to those skilled in the art.

The hardware elements in order to achieve the computing device may be realized by various circuitry elements, known to those skilled in the art. For example, CPU 1800 may be a Xenon or Core processor from Intel of America or an Opteron processor from AMD of America, or may be other processor types that would be recognized by one of ordinary skill in the art. Alternatively, the CPU 1800 may be implemented on an FPGA, ASIC, PLD or using discrete logic circuits, as one of ordinary skill in the art would recognize. Further, CPU 1800 may be implemented as multiple processors cooperatively working in parallel to perform the instructions of the inventive processes described above.

The computing device in FIG. 18 also includes a network controller 1806, such as an Intel Ethernet PRO network interface card from Intel Corporation of America, for interfacing with network 1845. As can be appreciated, the network 1845 can be a public network, such as the Internet, or a private network such as an LAN or WAN network, or any combination thereof and can also include PSTN or ISDN sub-networks. The network 1845 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1808, such as a NVIDIA GeForce GT21 or Quadro graphics adaptor from NVIDIA Corporation of America for interfacing with display 1810, such as a Hewlett Packard HPL2445w LCD monitor. A general purpose I/O interface 1812 interfaces with a keyboard and/or mouse 1814 as well as a touch screen panel 1816 on or separate from display 1810. General purpose I/O interface also connects to a variety of peripherals 1818 including printers and scanners, such as an OfficeJet or DeskJet from Hewlett Packard. A sound controller 1820 is also provided in the computing device such as Sound Blaster X-Fi Titanium from Creative, to interface with speakers/microphone 1822 thereby providing sounds and/or music.

The general purpose storage controller 1824 connects the storage medium disk 1804 with communication bus 1826, which may be an ISA, EISA, VESA, PCI, or similar, for interconnecting all of the components of the computing device. A description of the general features and functionality of the display 1810, keyboard and/or mouse 1814, as well as the display controller 1808, storage controller 1824, network controller 1806, sound controller 1820, and general purpose I/O interface 1812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 19.

Figure 19:
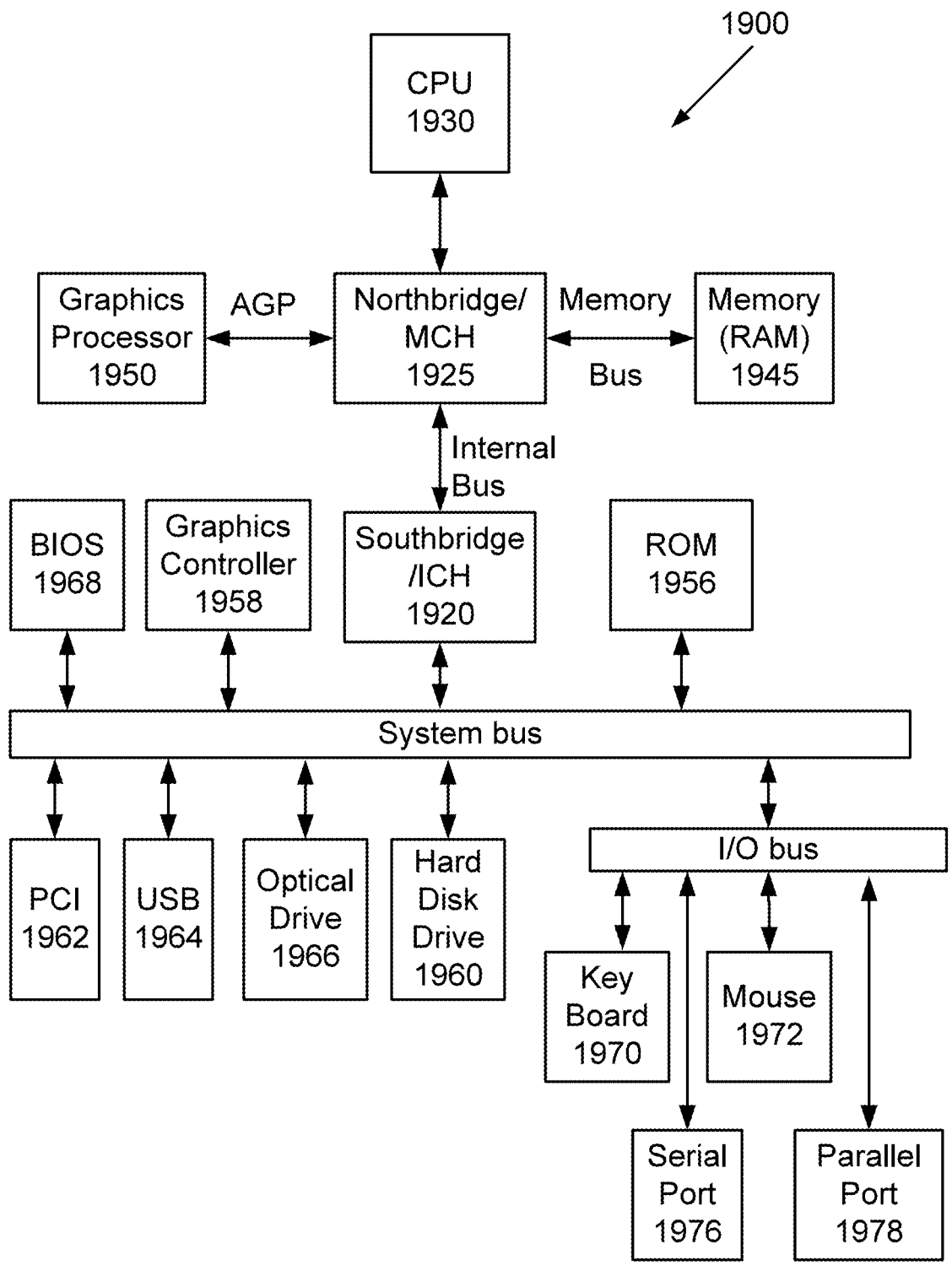
FIG. 19 is an exemplary schematic diagram of a data processing system, according to certain embodiments.

FIG. 19 shows a schematic diagram of a data processing system, according to certain embodiments, for performing the functions of the exemplary embodiments. The data processing system is an example of a computer in which code or instructions implementing the processes of the illustrative embodiments may be located.

In FIG. 19, data processing system 1900 employs a hub architecture including a north bridge and memory controller hub (NB/MCH) 1925 and a south bridge and input/output (I/O) controller hub (SB/ICH) 1920. The central processing unit (CPU) 1930 is connected to NB/MCH 1925. The NB/MCH 1925 also connects to the memory 1945 via a memory bus, and connects to the graphics processor 1950 via an accelerated graphics port (AGP). The NB/MCH 1925 also connects to the SB/ICH 1920 via an internal bus (e.g., a unified media interface or a direct media interface). The CPU Processing unit 1930 may contain one or more processors and even may be implemented using one or more heterogeneous processor systems.

Figure 20:
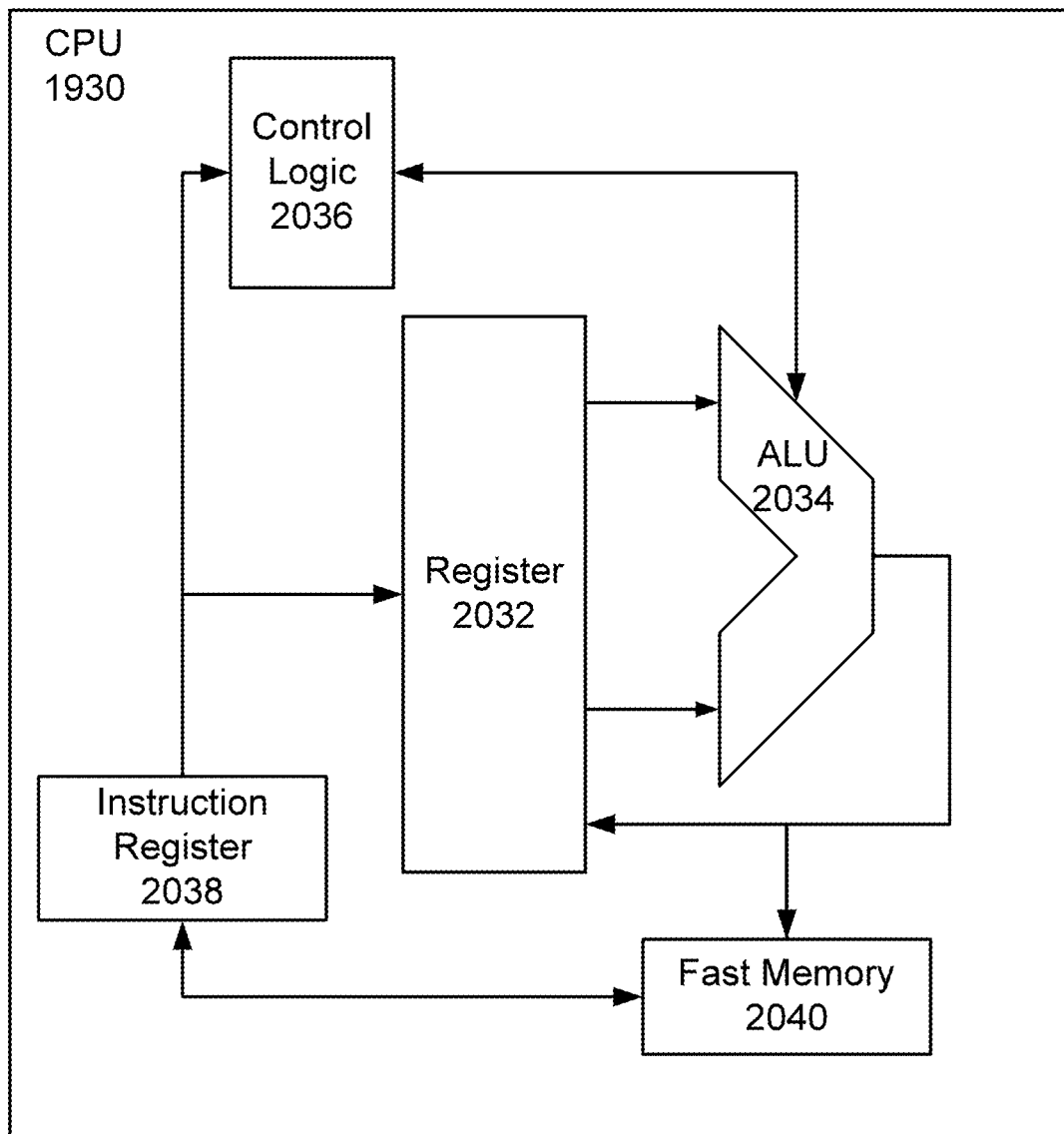
FIG. 20 is an exemplary schematic diagram of a processor, according to certain embodiments.

For example, FIG. 20 shows one implementation of CPU 1930. In one implementation, the instruction register 2038 retrieves instructions from the fast memory 2040. At least part of these instructions are fetched from the instruction register 2038 by the control logic 2036 and interpreted according to the instruction set architecture of the CPU 830. Part of the instructions can also be directed to the register 2032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2034 that loads values from the register 2032 and performs logical and mathematical operations on the loaded values according to the instructions. The results from these operations can be feedback into the register and/or stored in the fast memory 2040. According to certain implementations, the instruction set architecture of the CPU 1930 can use a reduced instruction set architecture, a complex instruction set architecture, a vector processor architecture, a very large instruction word architecture. Furthermore, the CPU 1930 can be based on the Von Neuman model or the Harvard model. The CPU 1930 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 19, the data processing system 1900 can include that the SB/ICH 1920 is coupled through a system bus to an I/O Bus, a read only memory (ROM) 1956, universal serial bus (USB) port 1964, a flash binary input/output system (BIOS) 1968, and a graphics controller 1958. PCI/PCIe devices can also be coupled to SB/ICH 1920 through a PCI bus 1962.

The PCI devices may include, for example, Ethernet adapters, add-in cards, and PC cards for notebook computers. The Hard disk drive 1960 and CD-ROM 1966 can use, for example, an integrated drive electronics (IDE) or serial advanced technology attachment (SATA) interface. In one implementation the I/O bus can include a super I/O (SIO) device.

Further, the hard disk drive (HDD) 1960 and optical drive 1966 can also be coupled to the SB/ICH 1920 through a system bus. In one implementation, a keyboard 1970, a mouse 1972, a parallel port 1978, and a serial port 1976 can be connected to the system bus through the I/O bus. Other peripherals and devices that can be connected to the SB/ICH 1920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A static electrostatic generator, comprising:
a conductive metal wire made of copper or gold having a first and a second end;
a cylindrical conductive metal sheet coaxial with the metal wire, the cylindrical conductive metal sheet having a first end and a second end, an interior surface and an exterior surface, wherein a length of the conductive metal wire is the same as a length of the cylindrical conductive metal sheet;
a conductive metal sphere made of aluminum surrounding the conductive metal wire and the cylindrical conductive metal sheet, the conductive metal sphere having an interior surface and an exterior surface, wherein the interior surface of the conductive metal sphere is evenly spaced from the exterior surface of the cylindrical conductive metal sheet, wherein the conductive metal sphere is patterned with stripes or blocks of copper or gold;
a first switch, a second switch and a third switch, each switch having a first side and a second side;
a battery having a first electrode and a second electrode, wherein the first electrode is connected to the first end of the conductive metal wire and the second electrode is attached to the first side of the first switch;
wherein the second side of the first switch is connected to the first end of the cylindrical conductive metal sheet;
the second switch having its first end connected to the second end of the conductive metal wire and its second end connected to the second end of the cylindrical conductive metal sheet;
the third switch having its first end connected to the cylindrical conductive metal sheet and its second end connected to the interior surface of the conductive metal sphere; and
a controller connected to each of the switches and having timing circuitry configured to operate the switches at specified times in order to generate static electrostatic charges on the surface of the conductive metal sphere.

2. The static electrostatic generator of claim 1, further comprising a dielectric material between the conductive metal wire and the cylindrical conductive metal sheet.

3. The static electrostatic generator of claim 2, wherein the dielectric material has relative permittivity, $\varepsilon_r$, in the range of 1-10, and is selected from the group consisting of air, PTFE, polyethylene, polymide, polypropylene, polystyrene, aluminum oxide, ceramic, mica and glass.

4. The static electrostatic generator of claim 1, wherein the switches are selected from the group consisting of transistors, electrically actuated switches, or electrically actuated mechanical switches.

* * * * *